United States Patent [19]
Suga et al.

[11] Patent Number: 5,734,403
[45] Date of Patent: Mar. 31, 1998

[54] INK-JET RECORDING PROCESS, AND INK SET AND INK-JET RECORDING APPARATUS FOR USE IN SUCH PROCESS

[75] Inventors: Yuko Suga, Tokyo; Jiro Moriyama, Yokohama; Masato Katayama, Yokohama; Toshiharu Inui, Yokohama; Yutaka Kurabayashi, Yokohama; Koromo Shirota, Inagi; Akio Kashiwazaki, Yokohama; Masahiko Tonogaki, Tokyo; Aya Takaide, Yokohama, all of Japan

[73] Assignee: Canon Kabushiki Kaisha, Tokyo, Japan

[21] Appl. No.: 649,337

[22] Filed: May 17, 1996

Related U.S. Application Data

[63] Continuation of Ser. No. 119,390, Sep. 13, 1993, abandoned.

[30] Foreign Application Priority Data

| Sep. 17, 1992 | [JP] | Japan | 4-334870 |
| Sep. 24, 1992 | [JP] | Japan | 4-254743 |
| Oct. 28, 1992 | [JP] | Japan | 4-290371 |
| Dec. 8, 1992 | [JP] | Japan | 4-328116 |

[51] Int. Cl.$^6$ .................................................. B41J 2/01
[52] U.S. Cl. .................................. 347/101; 347/100
[58] Field of Search ........................ 347/100, 96, 101

[56] References Cited

U.S. PATENT DOCUMENTS

| 4,804,411 | 2/1989 | Eida et al. | 106/22 |
| 4,864,324 | 9/1989 | Shirota et al. | 346/1.1 |
| 5,059,246 | 10/1991 | Yamamoto et al. | 106/22 |
| 5,074,914 | 12/1991 | Shirota et al. | 106/22 |
| 5,110,356 | 5/1992 | Shirota et al. | 106/22 |
| 5,116,409 | 5/1992 | Moffatt | 347/100 |
| 5,118,351 | 6/1992 | Shirota et al. | 106/22 |
| 5,123,960 | 6/1992 | Shirota et al. | 106/22 |
| 5,135,570 | 8/1992 | Eida et al. | 106/22 |
| 5,135,571 | 8/1992 | Shirota et al. | 106/22 |
| 5,139,573 | 8/1992 | Yamamoto et al. | 106/22 |
| 5,141,558 | 8/1992 | Shirota et al. | 106/22 |
| 5,151,128 | 9/1992 | Fukushima et al. | 106/20 |
| 5,160,370 | 11/1992 | Suga et al. | 106/20 |
| 5,172,133 | 12/1992 | Suga et al. | 346/1.1 |
| 5,181,045 | 1/1993 | Shields et al. | 347/100 |
| 5,184,148 | 2/1993 | Suga et al. | 346/1.1 |
| 5,190,581 | 3/1993 | Fukushima et al. | 106/20 D |
| 5,198,023 | 3/1993 | Stoffel | 106/22 R |
| 5,216,437 | 6/1993 | Yamamoto et al. | 346/1.1 |
| 5,220,347 | 6/1993 | Fukushima et al. | 346/1.1 |
| 5,221,333 | 6/1993 | Shirota et al. | 106/20 D |
| 5,229,786 | 7/1993 | Suga et al. | 346/1.1 |

(List continued on next page.)

FOREIGN PATENT DOCUMENTS

| 0509688 | 10/1992 | European Pat. Off. |
| 55-65269 | 5/1980 | Japan |
| 55-66976 | 5/1980 | Japan |
| 64-9279 | 1/1989 | Japan |
| 64-63185 | 3/1989 | Japan |
| 193969 | 2/1988 | United Kingdom |

OTHER PUBLICATIONS

Derwent Abstract (WPI) No. 90-352898 with respect to Japanese Patent No. 2-255775 (Oct. 16, 1990).

Derwent Abstract (WPI) No. 90-352897 with respect to Japanese Patent No. 2-255774 (Oct. 16, 1990).

*Primary Examiner*—Valerie Lund
*Attorney, Agent, or Firm*—Fitzpatrick, Cella, Harper & Scinto

[57] ABSTRACT

Disclosed herein is an ink-jet recording process which comprises using at least color inks of yellow, magenta and cyan colors and a black ink, and ejecting out the inks on a recording material to record a color image on the recording material, wherein the color inks contain a penetrability-imparting surfactant and/or a penetrable solvent, and the black ink contains a pigment as a coloring material. An ink set and an instrument for use in such a process are also disclosed.

11 Claims, 4 Drawing Sheets

U.S. PATENT DOCUMENTS

| | | | |
|---|---|---|---|
| 5,231,417 | 7/1993 | Shirota et al. | 346/1.1 |
| 5,248,991 | 9/1993 | Shirota et al. | 346/1.1 |
| 5,250,121 | 10/1993 | Yamamoto et al. | 106/22 R |
| 5,254,157 | 10/1993 | Koike et al. | 106/20 D |
| 5,258,066 | 11/1993 | Kobayashi et al. | 106/22 R |
| 5,320,668 | 6/1994 | Shields et al. | 347/100 |
| 5,382,283 | 1/1995 | Yui et al. | 347/100 |

MOVING DIRECTION OF CARRIAGE

CARRIAGE 81 82 83 84

BLACK
CYAN
MAGENTA
YELLOW

INK-JET RECORDING PROCESS, AND INK SET AND INK-JET RECORDING APPARATUS FOR USE IN SUCH PROCESS

This application is a continuation of application Ser. No. 08/119,390 filed Sep. 1, 1993 now abandoned.

BACKGROUND OF THE INVENTION

1. Field of the Invention

The present invention relates to an ink-jet recording process and a recording apparatus. In particular, it relates to an ink-jet recording process and a recording apparatus, by which high-quality color images can be formed on plain paper.

2. Related Background Art

Ink-jet recording system is a method in which recording is conducted by ejecting droplets of a recording medium (ink) and then applying the droplets to a recording material such as paper. In particular, according to the methods disclosed in Japanese Patent Publication Nos. 61-59911, 61-59912 and 61-59914 by the present applicant, in which an electrothermal converter is used as an ejection-energy supply means to apply thermal energy to an ink so as to generate bubbles, thereby ejecting droplets of the ink, formation of a high-density multi-orifice in a recording head can be realized with ease, and high-resolution and high-quality images can be recorded at high speed.

However, the conventional inks used in ink-jet recording generally comprise, as a principal component, water, and include additionally a water-soluble high boiling solvent such as glycol for the purpose of preventing drying and clogging, and the like. When such an ink has been used to conduct recording on plain paper, there have been disadvantages that the ink penetrates into the interior of the recording paper, resulting in a failure to achieve sufficient image density, and moreover, unevenness of image density occurs, which appears to be attributed to the uneven distribution of the filler and size on the surface of the recording paper. In particular, when color images are intended to form, plural inks of different colors are overlapped one after another before they are fixed. Therefore, color bleeding and uneven color mixing have occurred at portions of boundaries between images of different colors (hereinafter referred to as "bleeding" simply), resulting in a failure to obtain satisfactory images.

Japanese Patent Application Laid-Open No. 55-65269 discloses the use of inks added with a compound capable of enhancing their penetrability, such as a surfactant, and Japanese Patent Application Laid-Open No. 55-66976 discloses the use of inks comprising, as a principal component, a volatile solvent. However, the former method has involved a disadvantage that although the penetrability of the inks into recording paper is improved, and the bleeding can be prevented to some extent, the image density and the brightness of images are lowered because the inks penetrate deeply in the recording paper together with coloring matter. In addition, since the wettability to the surface of the recording paper is also improved, the inks tend to spread, resulting in reduction of resolution and occurrence of feathering. Therefore, such a method has not been preferred. In particular, this problem is remarkable when black-colored characters are expressed. On the other hand, the latter method is liable to cause clogging due to the evaporation of the solvent in a nozzle of a recording head in addition to the above-described disadvantages. Such a method has not hence been preferred.

Further, there have been disclosed methods of applying a liquid, which can make the quality of images better, to recording paper prior to the jetting of a recording ink. Japanese Patent Application Laid-Open No. 63-29971 discloses a method in which a liquid containing an organic compound having two or more cationic groups per molecule is applied to recording paper, and recording is then conducted with an ink containing an anionic dye. Japanese Patent Application Laid-Open No. 64-9279 discloses a method in which an acidic liquid containing succinic acid or the like is applied to recording paper, and recording is then conducted with an ink. Japanese Patent Application Laid-Open No. 64-63185 discloses a method of applying a liquid, which insolubilizes dyes, to recording paper prior to recording. All these methods intend to improve the fixability, water resistance and the like of images recorded owing to the deposition of the dye itself in the ink. Although all these methods have been able to prevent bleeding to some extent, and the quality of black-colored characters has not been much lowered, they have been poor in coverability on paper fibers in the recording paper because the dye has deposited unevenly on the recording paper, resulting in an image in which white voids are conspicuous. These methods have hence not been preferred. In addition, since these methods must apply the liquid, which can make the quality of images better, to recording paper prior to the jetting of the recording ink, and hence require apparatus or means for applying the liquid, they have involved disadvantages such that a recording apparatus becomes complicated to a considerable extent.

Further, inks used in an ink-jet recording system are required to have the following performance characteristics:

(1) being able to provide images excellent in water resistance, light fastness and rub-off resistance;

(2) being able to provide images excellent in ozone resistance so as not to undergo discoloration and fading by ozone, temperature and humidity even at a place where light is not illuminated;

(3) being excellent in resolution, or tone reproductivity in formation of color images on not only coated paper but also plain paper;

(4) being able to provide color images high in optical density and bright in color tone; and (5) being high in dissolution stability or storage stability in liquid medium components, and hard to cause clogging in an ejection orifice.

In particular, when a color image is formed, the quality of the whole image is impaired if only one of inks of yellow, magenta, cyan and black hues has poor fastness.

SUMMARY OF THE INVENTION

The present invention has been completed with the foregoing circumstances in view and has as an object the provision of an ink-jet recording process, by which sufficient image density is achieved even in recording on plain paper, evenness of image density is high, bleeding in color images is prevented in particular, the quality of black-colored characters becomes high, and simplification in recording apparatus is attained, and an ink set and a recording apparatus for use in such a process.

Another object of the present invention is to provide an ink jet recording method and ink jet recording apparatus capable of obtaining a recorded image on a plain paper with sufficient optical density and exhibiting excellent fastness (such as abrasion resistance, water resistance and light resistance) while maintaining various characteristics, such as, discharge stability, long-term storage stability and clogging prevention at the tip of the orifice.

The object can be achieved by the present invention described below.

In a first aspect of the present invention, there is thus provided an ink-jet recording process which comprises using at least color inks of yellow, magenta and cyan colors and a black ink, and ejecting out the inks on a recording material to record a color image on the recording material, wherein the color inks contain a penetrability-imparting surfactant and/or a penetrable solvent, and the black ink contains a pigment as a coloring material.

In the first aspect of the present invention, there is also provided an ink set for color ink-jet recording, comprising at least yellow, magenta, cyan and black inks, wherein the color inks of the yellow, magenta and cyan colors contain a penetrability-imparting surfactant and/or a penetrable solvent, and the black ink contains a pigment as a coloring material.

In the first aspect of the present invention, there is further provided a recording unit equipped with ink container parts separately containing inks of different colors therein and heads from which the inks are ejected in the form of inks droplets, wherein the ink container parts separately contain the inks in the ink set as described above.

In the first aspect of the present invention, there is still further provided an ink cartridge equipped with ink container parts separately containing inks of different colors therein, wherein the ink container parts separately contain the inks in the ink set as described above.

In the first aspect of the present invention, there is yet still further provided an ink-jet recording apparatus comprising a recording unit equipped with ink container parts separately containing inks of different colors therein and heads from which the inks are ejected in the form of ink droplets, wherein the ink container parts separately contain the inks in the ink set as described above.

In the first aspect of the present invention, there is yet still further provided an ink-jet recording apparatus comprising a recording head from which inks are ejected in the form of ink droplets, an ink cartridge equipped with ink container parts separately containing inks of different colors therein, and ink feeders for feeding the inks from the ink cartridge to the recording head, wherein the ink container parts separately contain the inks in the ink set as described above.

In a second aspect of the present invention, there is thus provided an ink-jet recording process, which comprises using at least recording inks of yellow, magenta, cyan and black colors, and ejecting out the recording inks on a recording material to record a color image on the recording material, wherein the recording inks of the yellow, magenta and cyan colors contain at least a penetrability-imparting surfactant or a penetrable solvent and a salt, and the recording ink of the black color contains components which cause viscosity increase or aggregation by the action of the salt.

In the second aspect of the present invention, there is also provided an ink-jet recording apparatus comprising a recording unit equipped with ink container parts separately containing recording inks of different colors therein and heads from which the recording inks are ejected in the form of ink droplets, wherein the recording inks satisfy the requirements as described above.

In the second aspect of the present invention, there is further provided an ink-jet recording apparatus comprising a recording head from which inks are ejected in the form of ink droplets, an ink cartridge equipped with ink container parts separately containing inks of different colors therein, and ink feeders for feeding the inks from the ink cartridge to the recording head, wherein the recording inks satisfy the requirements as described above.

In a third aspect of the present invention, there is thus provided a method of forming a color image according to an ink-jet recording system making use of water-based inks of yellow, magenta, cyan and black colors, wherein the magenta ink contains, as a coloring material, at least one dye represented by the following general formula (I), the yellow ink contains, as a coloring material, at least one dye represented by the following general formula (II), the cyan ink contains, as a coloring material, at least one dye represented by the following general formula (III), and the black ink contains, as a coloring material, at least one pigment selected from acid carbon black, neutral carbon black and basic carbon black:

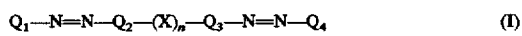

wherein $Q_1$ to $Q_4$ mean independently a benzene or naphthalene ring which may be substituted by a sulfonic, carboxyl, amino, anilino, acetylamino, hydroxyl, alkyl or alkoxyl group, or a chlorine atom, X denotes a linkage of —NHCONH—, —NH—, —O— or

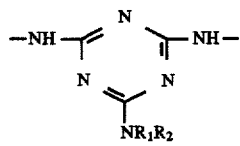

in which $R_1$ and $R_2$ mean independently a hydrogen atom or a hydroxyethyl group, and n stands for 0 or 1, with the proviso that the sulfonic and carboxyl groups each form a salt with any base of alkali metal atoms, ammonia and organic amines;

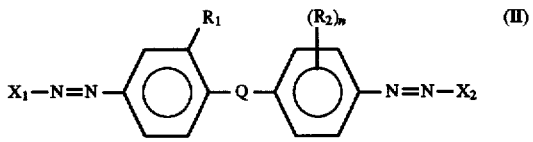

wherein Q means a linkage of —NHCONH— or

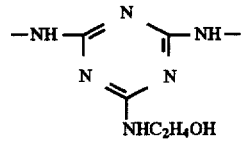

$X_1$ and $X_2$ denote independently a hydrogen atom, or a phenyl or naphthyl group substituted by —$SO_3M$, —COOM or hydroxyl group in which M means an alkali metal atom, ammonium ion or organic amino group, $R_1$ and $R_2$ represent independently a methyl or methoxy group, and n stands for 0 or 1; and

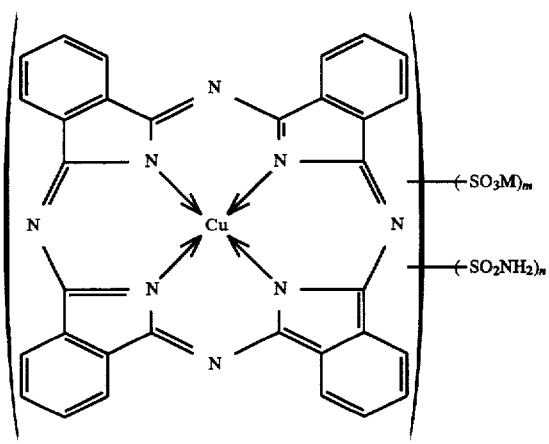

(III)

wherein M means an alkali metal atom, ammonium ion or organic amino group, and m and n stand for numbers of 0 to 4 and 0 to 3, respectively.

In the third aspect of the present invention, there is also provided a method of forming a color image according to an ink-jet recording system making use of water-based inks of yellow, magenta, cyan and black colors, wherein the magenta ink contains, as a coloring material, at least one dye represented by the following general formula (IV), the yellow ink contains, as a coloring material, at least one dye represented by the following general formula (II), the cyan ink contains, as a coloring material, at least one dye represented by the following general formula (III), and the black ink contains, as a coloring material, at least one pigment selected from acid carbon black, neutral carbon black and basic carbon black:

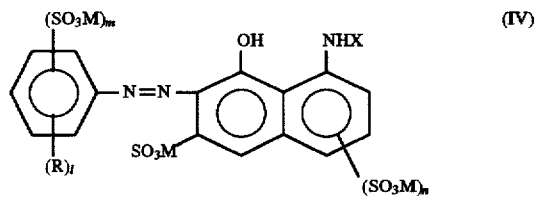

(IV)

wherein R means a hydrogen or halogen atom, or a lower alkyl, lower alkoxyl, lower acylamino or nitro group, X denotes any one of acetyl, benzoyl, paratoluenesulfonyl, 4-chloro-6-hydroxy-1,3,5-triazine-2-yl groups, M represents an alkali metal atom, ammonium ion or organic amino group, and l, m and n stand for numbers of 0 to 2, 0 or 1, and 0 or 1, respectively;

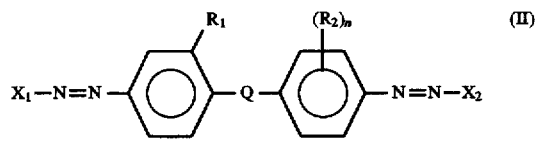

(II)

wherein Q means a linkage of —NHCONH— or

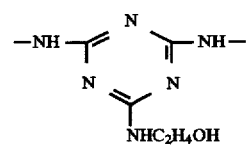

$X_1$ and $X_2$ denote independently a hydrogen atom, or a phenyl or naphthyl group substituted by —$SO_3M$, —COOM or hydroxyl group in which M means an alkali metal atom, ammonium ion or organic amino group, $R_1$ and $R_2$ represent independently a methyl or methoxy group, and n stands for 0 or 1; and

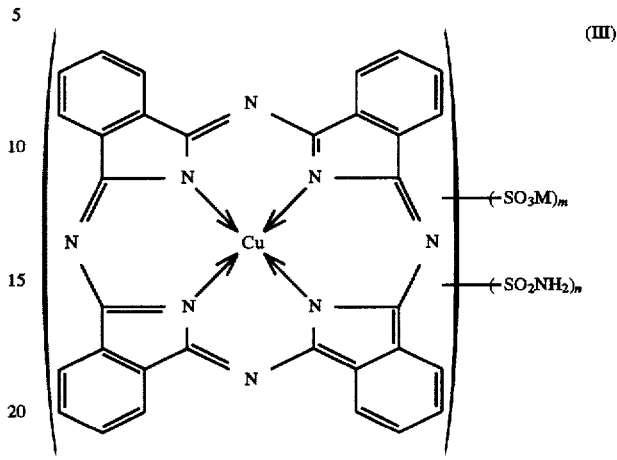

(III)

wherein M means an alkali metal atom, ammonium ion or organic amino group, and m and n stand for numbers of 0 to 4 and 0 to 3, respectively.

In the fourth aspect of the present invention, there is provided an ink jet recording method comprising a step of:
discharging a black ink droplet and a color ink droplet onto a recording medium, overlapping the black ink with the color ink on the recording medium, wherein
said black ink contains a pigment, a water-soluble resin for dispersing said pigment and water, and
said color ink contains a water-soluble dye, a water-soluble solvent and water, said ink having a pH of 4 or lower.

In the fourth aspect of the present invention, there is provided an ink jet recording method comprising a step of:
discharging a black ink droplet and a color ink droplet onto a recording medium, overlapping the black ink with the color ink on the recording medium, wherein
said black ink contains a pigment, a water-soluble resin for dispersing said pigment and water, and
said color ink contains a water-soluble dye, a water-soluble solvent, water and a salt.

DESCRIPTION OF THE PREFERRED EMBODIMENTS

Figure 1:
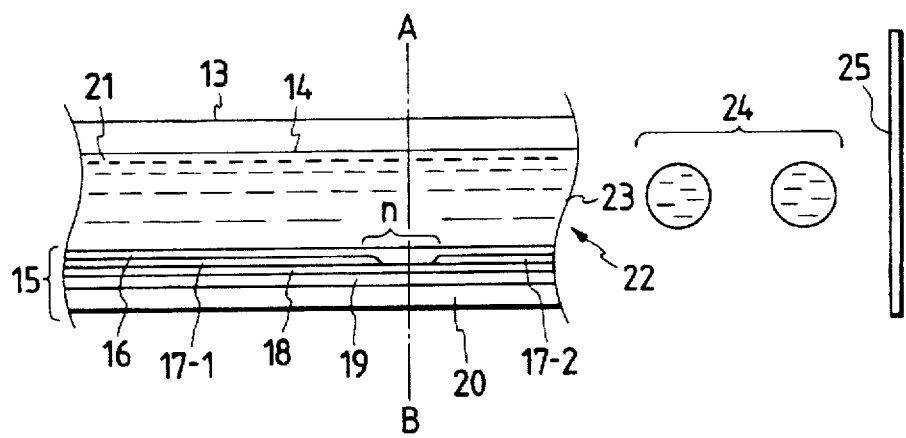
FIG. 1 is a longitudinal cross-sectional view of a head of an ink-jet recording apparatus.

The present invention is composed of the above-described three aspects.

First of all, the first aspect of the present invention will hereinafter be described in detail.

The present inventors have confirmed that when in a process wherein color inks of yellow, magenta and cyan colors and a black ink are at least used and the inks are ejected out on plain paper to record a color image, the four inks are prepared in such a manner that the yellow, magenta and cyan inks contain a penetrability-imparting surfactant or a penetrable solvent, and the black ink contains a pigment, a record image which fulfills the above object can be obtained even when the black ink is mixed with the color ink so long as the black ink is caused to aggregate on the surface of recording paper right after it impacts against the paper.

More specifically, if the inks of yellow, magenta and cyan colors (hereinafter referred to as "color inks") contain a penetrability-imparting surfactant or a penetrable solvent, the penetrability of the color inks into recording paper is improved, so that the color inks penetrate the paper almost in a moment. Therefore, bleeding between the color inks can be prevented. However, when an ink of a black color (hereinafter referred to as "black ink") is prepared in the same manner as the color inks, feathering occurs and the quality of recorded characters is deteriorated, so that the penetrability cannot be imparted thereto. So, the present inventors have now found that when a pigment-containing ink is used as the black ink, the black ink aggregates on the surface of recording paper right after its impact against the recording paper so that the pigment component contained in the black ink may be fixed in the vicinity of the surface of the recording paper, whereby bleeding between the color ink and the black ink can be prevented even if the black ink is brought into contact with the color ink, and a high-quality image, which is high in image density, and bright and even, can be provided, leading to completion of the first aspect of the present invention.

The use of the pigment-containing ink as a black ink makes it possible to achieve sufficient image density and to provide an image, in which bleeding in a color image is prevented, and a high character quality can be attained. With respect to the recording order of the black ink and the color ink, it is desirable that the black ink be ejected first to conduct recording. The reason is that the black ink aggregates immediately after its arrival at the recording paper and is fixed, whereby a resultant image can retain sharpness even when the color ink arrives thereafter. To the contrary, if the black ink is printed after printing the color ink, there is a potential problem that the aggregating effect of the black ink on the surface of the recording paper may be lessened at boundary portions between the color ink and the black ink under the influence of the remaining color ink, resulting in not only a failure to achieve sharp printing, but also reduction in bleeding-preventing effect.

The first aspect of the present invention will hereinafter be described in detail.

The feature of the color inks according to the first aspect of the present invention is to contain the penetrability-imparting surfactant or penetrable solvent. No particular limitation is imposed on the surfactant contained so long as it can impart penetrability to the color inks according to the first aspect of the present invention.

Examples of the surfactant used include anionic surfactants such as fatty acid salts, higher alcohol sulfuric ester salts, alkylbenzenesulfonates and higher alcohol phosphoric ester salts; cationic surfactants such as aliphatic amine salts and quaternary ammonium salts; nonionic surfactants such as ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, fatty acid esters of polyhydric alcohols and alkanolamine fatty acid amides; and amino acid- and betaine-type amphoteric surfactants. No particular limitation is imposed on such a surfactant. However, nonionic surfactants such as ethylene oxide adducts of higher alcohols, ethylene oxide adducts of alkylphenols, ethylene oxide-propylene oxide copolymers and ethylene oxide adducts of acetylene glycol are preferably used. Further, it is particularly preferred that the number of moles of added ethylene oxide in the ethylene oxide adducts should be within a range of from 4 to 20.

No particular limitation is imposed on the amount of the surfactant to be added. However, it may preferably be within a range of from 0.01 to 10% by weight. If the amount is less than 0.01% by weight, the penetrability can not generally be imparted to the desired extent though it may vary according to the kind of the surfactant used. If the amount exceeds 10% by weight, the initial viscosity of the resulting ink is increased. It is not hence preferable to use the surfactant in such a little or great amount.

Examples of the penetrable solvent preferably used include ethers such as tetrahydrofuran and dioxane, lower alkyl ethers of polyhydric alcohols such as ethylene glycol methyl ether, diethylene glycol monomethyl ether and triethylene glycol monomethyl ether, ethanol, isopropyl alcohol, and the like.

No particular limitation is imposed on the amount of the solvent to be added. However, it may preferably be within a range of from 0.1 to 20% by weight based on the total weight of the ink though it may vary according to the kind of the solvent used. If the amount is less than 0.1% by weight, the penetrability can not generally be imparted to the desired extent. If the amount exceeds 20% by weight, the solubility of a colorant used is somewhat lowered. It is not hence preferable to use the solvent in such a little or great amount.

As dyes usable in the inks, there can be used almost all water-soluble acid dyes, direct dyes, basic dyes and reactive dyes, which are described in COLOR INDEX. Any dyes not described in COLOR INDEX may also be used so long as they are soluble in water. No particular limitation is imposed on the amount of the dye to be used. However, it may preferably be within a range of from 0.1 to 20% by weight based on the total weight of the ink.

Each of the inks generally contains water and optionally, a water-soluble organic solvent in addition to the above-described surfactant or penetrable solvent. Examples of the water-soluble solvent used include amides such as dimethylformamide and dimethylacetoamide; ketones such as acetone; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; lower alkyl ethers of polyhydric alcohols such as ethylene glycol methyl ether, diethylene glycol monomethyl ether and triethylene glycol monomethyl ether; monohydric alcohols such as ethanol and isopropyl alcohol; and besides, glycerol; 1,2,6-hexanetriol; N-methyl-2-pyrrolidone; 1,3-dimethyl-2-imidazolidinone; triethanolamine; sulfolane; dimethyl sulfoxide; and the like. No particular limitation is imposed on the content of the water-soluble organic solvent. However, it may preferably be within a range of from 1 to 80% by weight based on the total weight of the ink.

In addition to the above components, the inks may contain additives such as viscosity modifiers, pH adjustors, antiseptics, antioxidants and evaporation accelerators, as needed.

The black ink used in the first aspect of the present invention will be described below. The content of the pigment used in the black ink according to the first aspect of this invention may preferably be within a range of from 1 to 20% by weight, more preferably from 2 to 12% by weight based on the total weight of the ink. As a pigment used as a coloring material in the first aspect of the present invention, any pigments can be used so long as they satisfy the above-described performance. Carbon black usable in the black ink may be acid, neutral or basic, and may include those produced in accordance with the furnace process or channel process and having a primary particle size of 15 to 40 mμ, a specific surface area of 50 to 300 $m^2/g$ as determined in accordance with the BET method, an oil absorption of 40 to 150 ml/100 g as determined by using DBP, a volatile matter of 0.5 to 10%, and a pH of 2 to 9, for example, commercially-available carbon black such as No. 2300, No. 900, MCF 88, No. 33, No. 40, No. 45, No. 52, MA 7, MA 8 and No. 2200 B (all, products of Mitsubishi Chemical Industries Limited), RAVEN 1255 (product of Columbian Carbon Japan Limited), REGAL 400R, REGAL 330R, REGAL 660R and MOGUL L (all, products of Cabot Company), and Color Black FW1, Color Black FW18, Color Black S170, Color Black S150, Printex 35 and Printex U (all, products of Degussa). The black ink according to the first aspect of the present invention contains a dispersant for dispersing the pigment. As the dispersant, any resins may be used so long as they are soluble in water. However, they preferably have a weight average molecular weight ranging from 1,000 to 30,000, more preferably from 3,000 to 15,000. Specific examples thereof include block copolymers, random copolymers and graft copolymers composed of at least two monomers (at least one monomer being hydrophilic) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, and the like, and salts thereof. These resins are alkali-soluble resins which dissolve in an aqueous solution of a base. Besides, homopolymers composed of a hydrophilic monomer or a salt thereof may be used. Further, other water-soluble resins such as polyvinyl alcohol, carboxymethyl cellulose and condensation products of naphthalene sulfonic acid and formaldehyde may also be used. However, the use of the alkali-soluble resin has an advantage in that the viscosity of the resultant dispersion can be made low, and moreover the pigment can be easily dispersed. Further, resins which start aggregating at a pH of 6 or lower are particularly preferred for improving printing density and preventing bleeding. The water-soluble resin according to the first aspect of the present invention may preferably be contained in a proportion ranging from 0.1 to 5% by weight based on the total weight of the ink. It is further desirable that the black ink according to the first aspect of this invention is adjusted to neutrality or alkalinity, preferably, as a whole because the solubility of the water-soluble resin is enhanced, so that an ink excellent in long-term storability can be provided. In this case, however, the pH may desirably be adjusted to a range of from 7 to 10 because the possibility that various parts or members used in an ink-jet recording apparatus could be corroded may arise.

Examples of the pH adjustors may include various kinds of organic amines such as diethanolamine and triethanolamine, inorganic alkalis such as the hydroxides of alkali metals, for example, sodium hydroxide, lithium hydroxide, potassium hydroxide, etc., organic acids, and mineral acids. The pigment and water-soluble resin as described above are dispersed or dissolved in an aqueous medium.

An aqueous medium suitable for use in the black ink according to the first aspect of this invention is a mixed solvent of water and a water-soluble organic solvent. As the water, it is preferable to use ion-exchanged water (deionized water) instead of tap water containing various ions.

Examples of the optional water-soluble organic solvent used in combination with water may include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols of which alkylene moiety has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 2-pyrrolidone; 1,3-dimethyl-2-imidazolidinone; and the like. Among a number of these water-soluble organic solvents, polyhydric alcohols such as diethylene glycol and lower alkyl ethers of polyhydric alcohols, such as triethylene glycol monomethyl (or monoethyl) ether are preferred.

In order to achieve good ejection stability, it is effective to add further ethanol or isopropyl alcohol in an amount of 1% or more because the addition of these solvents is considered to permit more stable bubbling of the recording liquid on a thin film resistor.

The content of the water-soluble organic solvent in the black ink according to the first aspect of the present invention is generally within a range of from 3 to 50%, preferably from 3 to 40% by weight based on the total weight of the ink, while the content of water used is within a range of from 10 to 90% by weight, preferably from 30 to 80% by weight based on the total weight of the ink.

Further, the black ink according to the first aspect of the present invention may contain, in addition to the above components, surfactants, antifoaming agents, antiseptics and the like as needed to provide it as an ink having desired physical properties. Commercially-available water-soluble dyes and/or the like may also be added thereto.

No particular limitation is imposed on the surfactants added so long as they do not adversely affect the storage stability and the like of the ink. Examples of such surfactants used include anionic surfactants such as fatty acid salts, fluorocarbon type surfactants, sulfuric ester salts of higher alcohols, sulfuric ester salts of liquid fatty oils and alkylaiylsulfonates; and nonionic surfactants such as polyoxyethylene alkyl ethers, polyoxyethylene alkyl esters, polyoxyethylene sorbitan alkyl esters, acetylene alcohols and acetylene glycols. These surfactants may be suitably chosen for either single use or combined use. The amount of the surfactants to be used may vary in dependence on the kind of the dispersant used. However, it may desirably be within a range of from 0.01 to 5% by weight based on the total weight of the ink.

The black ink according to the first aspect of the present invention is prepared in the following manner. The pigment is first added to an aqueous solution containing at least the dispersant resin and water to stir them. A dispersion treatment is then conducted in accordance with a dispersing technique described below, and if necessary, a centrifugation is carried out to obtain a desired dispersion. The compounds used in the first aspect of this invention, i.e., the above-mentioned components, are then added to the dispersion. The resultant mixture is stirred to prepare the intended black ink.

If the alkali-soluble resin is used, it is necessary to add a base for dissolving the resin in the dispersion.

It is effective to further conduct premixing for at least 30 minutes prior to the dispersion treatment of the aqueous solution containing the pigment. This premixing serves to improve the wettability of the surface of the pigment and facilitate adsorption on the pigment surface.

Preferred examples of the alkali added to the dispersion if the alkali-soluble resin is used include organic amines such as monoethanolamine, diethanolamine, triethanolamine, aminomethylpropanol and ammonia, and inorganic bases such as potassium hydroxide and sodium hydroxide.

Any dispersing machine routinely used may be employed as a dispersing machine used in the preparation of the black ink according to the first aspect of this invention. Examples thereof may include ball mills, roll mills and sand mills.

Of these mills, high-speed sand mills are preferred. Examples thereof may include Super Mill, Sand Grinder, Beads Mill, Agitator Mill, Grain Mill, Dyno Mill, Pearl Mill, Coball Mill (all, trade names), etc.

In the first aspect of the present invention, methods of obtaining a pigment having a desired particle size distribution may include techniques in which the size of a grinding medium in a dispersing machine is made smaller, in which the packing rate of a grinding medium is made higher, in which processing time is made longer, in which discharging rate is made lower, and in which classification is conducted by filter, centrifugal separator or the like after grinding. Any combination thereof may also be included.

The second aspect of the present invention will hereinafter be described in detail.

The present inventors have confirmed that when in a process wherein recording inks of yellow, magenta, cyan and black colors are at least used and the inks are ejected out on plain paper to record a color image, the four inks are prepared in such a manner that the recording inks of the yellow, magenta and cyan colors contain at least a penetrability-imparting surfactant or a penetrable solvent and a salt, and the recording ink of the black color undergoes viscosity increase or aggregation by the action of the salt, a record image which fulfills the above object can be obtained.

More specifically, 1) if the recording inks of yellow, magenta and cyan colors (hereinafter referred to as "color inks") contain a penetrability-imparting surfactant or a penetrable solvent, the penetrability of the color inks into recording paper is improved, so that the color inks penetrate the paper almost in a moment. Therefore, bleeding between the color inks can be prevented. However, 2) when a recording ink of a black color (hereinafter referred to as "black ink") is prepared in the same manner as the color inks, feathering occurs and the quality of recorded characters is deteriorated, so that the penetrability can not be imparted thereto. Therefore, 3) the present inventors have considered that if an interaction occurs between components in a color ink and a black ink, namely, when the color ink containing a salt and the black ink containing components which cause viscosity increase or aggregation by the action of the salt come into contact with each other, the black ink undergoes viscosity increase or aggregation, so that the dye contained in the ink is fixed in the vicinity of the surface of the recording paper, whereby bleeding between the color ink and the black ink can be prevented with the result that a high-quality image, which is high in image density, bright and even, and also good in rub-off resistance, can be provided, and have proven this fact by an experiment, leading to completion of the second aspect of the present invention.

The second aspect of the present invention features that the color inks comprise the same components as in the color inks according to the first aspect and a salt, and the black ink contains components which cause viscosity increase or aggregation by the action of the salt contained in each color ink.

It is only necessary for the salt contained in the color inks used in the second aspect of the present invention to be soluble in water and be electrolytic. Specific examples thereof may include chlorides such as sodium chloride, potassium chloride, lithium chloride, ammonium chloride, calcium chloride, magnesium chloride and barium chloride; carbonates such as calcium carbonate, magnesium carbonate, barium carbonate, sodium carbonate, lithium carbonate and ammonium carbonate; acetates such as sodium acetate, potassium acetate and lithium acetate; sulfates such as sodium sulfate, potassium sulfate and aluminum sulfate; and besides, nitrates, sulfites, nitrites, etc. However, salts to be used are not limited particularly to these salts.

The black ink used in the second aspect of this invention contains components which cause viscosity increase or aggregation by the action of the above-described salt contained in the color inks. More specifically, a recording liquid of a dispersed system, which comprises a pigment, a dispersant for dispersing the pigment and water or a mixed solvent containing at least water, may preferably be used. However, a coloring material is not limited to the pigment so long as the recording liquid is of a dispersed system. The mechanism of viscosity increase or aggregation which occurs when the black inks comes into contact with the color ink is in that dispersion breaking occurs. The above mechanism not only prevents the bleeding at boundary areas between the color ink and the black ink, but also has an effect of increasing the density of a resulting print because the black ink is subjected to dispersion breaking, so that the coloring material aggregated fills gaps between fibers of paper.

The third aspect of the present invention will hereinafter be described in detail.

The present inventors have carried out an extensive investigation with the view toward achieving the above object, and have concluded that when only water-soluble dyes are used as coloring materials for ink-jet recording inks like the conventional inks, all inks cannot satisfy the above-described properties (1) through (5) at the same time. Therefore, an investigation as to pigments has been carried out. As a result, it has been found that when inks prepared by using specific dyes and pigments in combination are used, a color image satisfying all the properties (1) through (5) can be formed, leading to completion of the third aspect of the present invention.

More specifically, according to the third aspect of the present invention, a color image is formed by an ink-jet recording method in which ink-jet recording inks containing a specific dye or pigment are used, and thermal energy according to recording signals is applied to the inks, thereby ejecting them in the form of droplets out of respective minute orifices to conduct recording. The inks used in the third aspect of this invention contain a specific dye or pigment, and are composed of the dye or pigment and an aqueous medium containing a water-soluble resin, a polyhydric alcohol and an aliphatic monohydric alcohol.

It goes without saying that dyes and pigments which are coloring materials in water-based inks used in the ink-jet recording system are required to have various performance characteristics. In particular, when a color image is formed, it is important for the individual dyes and pigments of black, yellow, magenta and cyan to be well balanced among performance characteristics such as water resistance, light fastness and ozone resistance, and to have a good relationship of color rendering with one another. It has been extremely difficult to find a combination of dyes and pigments of three primary colors, which have such characteristics or properties. However, the extensive investigation of the present inventors has led to realization of a best method for forming a color image in accordance with an ink-jet recording system by using in combination groups of specific dyes and pigments, as will be described subsequently.

Specific examples of such dyes used in the third aspect of the present invention may include the following dyes. Incidentally, in the formulae of the following dyes, the sulfonic groups and carboxyl groups are represented as salts with alkali metals. However, it goes without saying that all such groups may exist in the form of ammonium salts or amine salts.

Magenta dye:

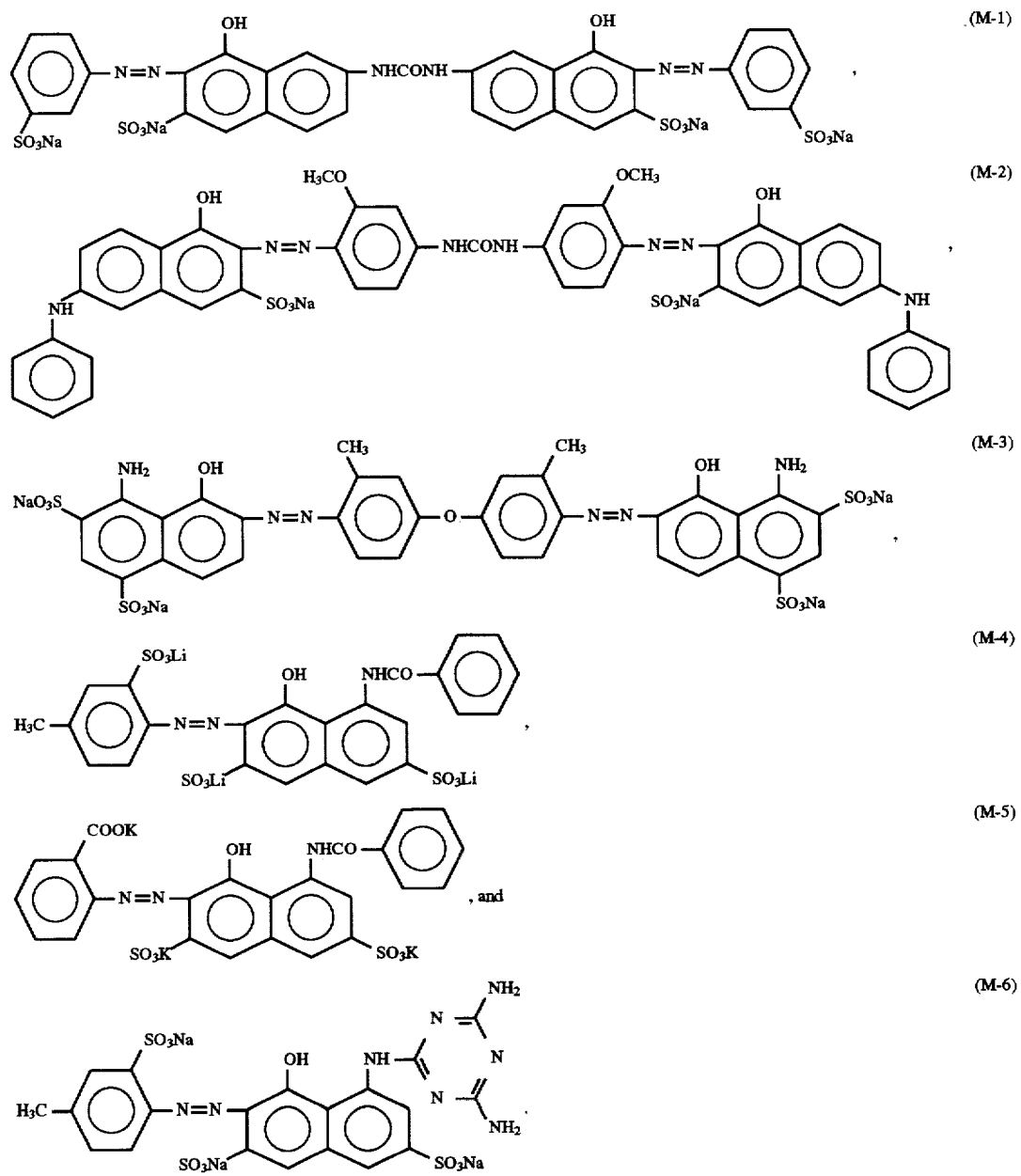

Yellow dye:

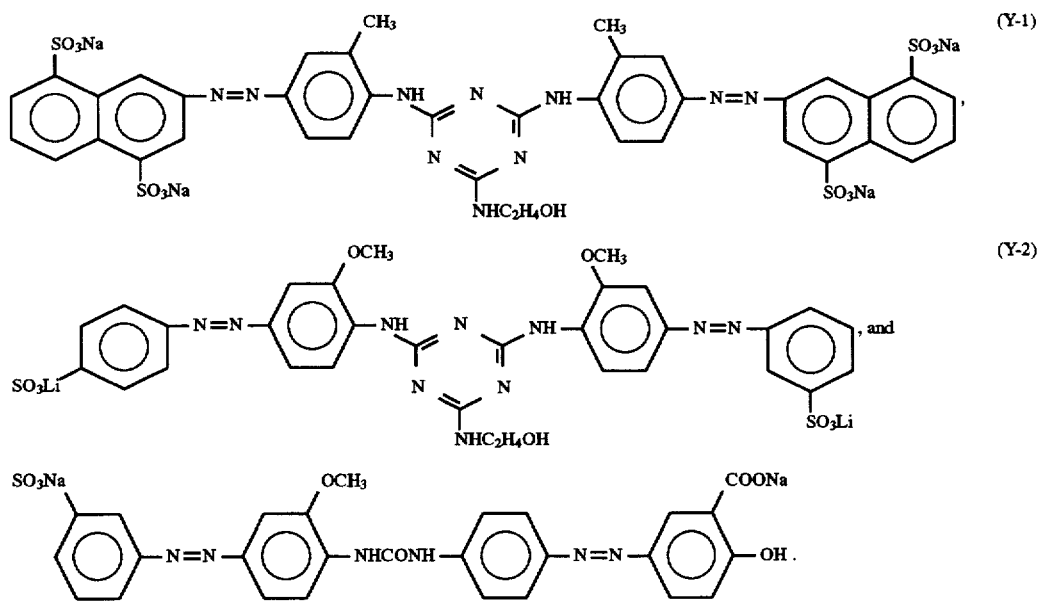

Cyan dye:

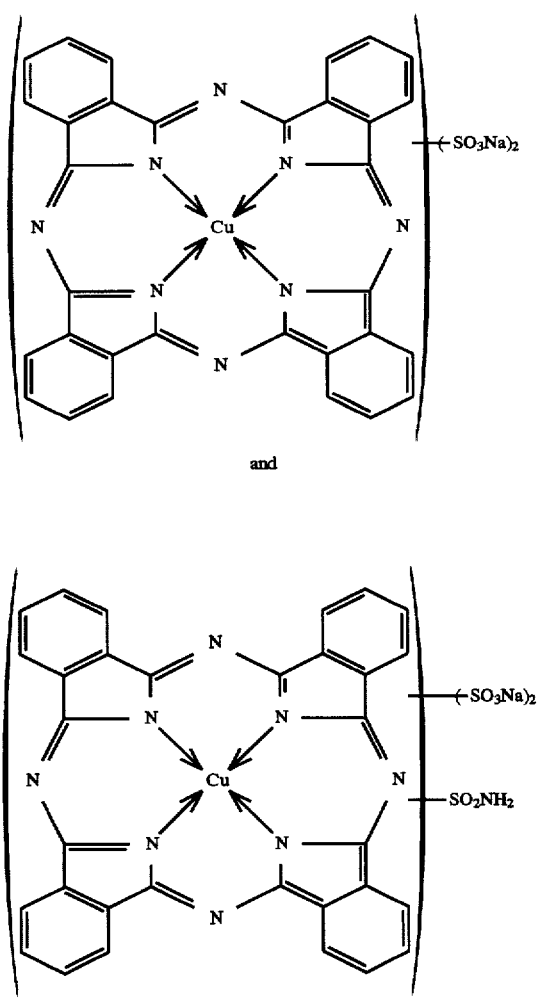

Each of the water-based inks of magenta, cyan and yellow colors, which are used in the third aspect of this invention, can contain at least one of its corresponding dyes as mentioned above as a coloring material. However, it may contain one or more dyes other than those mentioned above, to say nothing of plural dyes of the same color, which have been mentioned above. More specifically, the above-mentioned dyes of the same color may be used either singly or in any combination thereof. Alternatively, they may be used as an essential component in combination with various dyes such as direct dyes and acid dyes other than those mentioned above.

On the other hand, the black ink may be prepared from any black pigment as described in the first aspect.

With respect to the dye-containing inks of magenta, cyan and yellow colors, which are used in the third aspect of the present invention, the contents of the above-described specific dyes in the respective inks may be determined according to the kinds of the liquid medium components, properties required of the inks, and the like. However, the dyes may be generally used in a range of from 0.1 to 20% by weight, preferably from 0.5 to 15% by weight, more preferably from 1 to 10% by weight based on the total weight of each ink.

It goes without saying that the above-mentioned dyes may be used either singly or in any combination thereof. Alternatively, it is also possible to use these dyes as an essential component in combination with various dyes such as direct dyes and acid dyes other than those mentioned above.

With respect to the black ink used in the third aspect of the present invention, the content of the pigment used is generally within a range of from 3 to 20% by weight, preferably from 3 to 12% by weight based on the total weight of the ink though it may vary according to the kind of the pigment used.

As a dispersant, there may be used any water-soluble resin used in dispersion of pigment. Such a water-soluble resin must be soluble in an aqueous solution with an amine or base dissolved therein and have a weight average molecular weight ranging from 3,000 to 30,000. Any water-soluble resins may preferably be used so long as they have a weight average molecular weight ranging from 5,000 to 15,000.

Specific examples of these resins include naturally-occurring polymers such as lignosulfonates and shellac, polyacrylic acid, styrene-acrylic acid copolymers, styrene-acrylic acid-alkyl acrylate copolymers such as styrene-acrylic acid-ethyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinylnaphthalene-acrylic acid copolymers, vinylnaphthalene-maleic acid copolymers, styrene-maleic half ester-maleic anhydride copolymers, and salts thereof, and the like.

It is desirable that the content of these water-soluble resins be controlled in such a manner that the weight ratio of the pigment to the water-soluble resin falls within a range of from 10:3 to 10:0.1, preferably from 10:3 to 10:0.2. It is more desirable that the amount of the water-soluble resins dissolved in the ink is not more than 2% by weight, preferably not more than 1% by weight based on the total weight of the ink. If the amount of the pigment exceeds the above upper limit, the dispersion stability of the resulting ink is deteriorated, and the sedimentation of pigment hence occurs. On the contrary, amounts of the pigment less than the above lower limit result in an ink deteriorated in bubbling property, which causes the accumulation of insolubles on a thin film resistor upon application of pulses, so that such an ink cannot be stably ejected out for a long period of time.

An aqueous medium suitable for use in the inks according to the third aspect of this invention is a mixed solvent of water and a water-soluble organic solvent. As the water, it is preferable to use ion-exchanged water (deionized water) instead of tap water containing various ions. The content of water is within a range of from 10 to 60% by weight, preferably from 10 to 50% by weight.

Examples of the optional solvent components used in combination may include water-soluble organic solvents used in the form of a mixture with water. Examples of the aliphatic monohydric alcohol may include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol.

Of these, ethyl alcohol and isopropyl alcohol are particularly preferred because they can provide an ink greatly improved in ejection stability.

The content of the aliphatic monohydric alcohol is within a range of from 3 to 15% by weight, preferably from 3 to 10% by weight. Contents less than 3% by weight result in an ink which is not always stably ejected upon change in drive conditions of a printer. On the other hand, contents exceeding 15% by weight result in an ink which provides prints impaired in image quality.

Examples of the polyhydric alcohol and/or alkyl ether thereof used in the third aspect of the present invention may include polyalkylene glycols such as polyethylene glycol and polypropylene glycol; alkylene glycols of which the alkylene moiety has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether.

The content of these polyhydric alcohols and/or alkyl ethers thereof is within a range of from 10 to 50% by weight, preferably from 20 to 40% by weight. Contents less than 10% by weight are insufficient to prevent the clogging of the resulting ink on the tip of a nozzle. On the other hand, contents exceeding 50% by weight result in an ink which provides prints impaired in image quality.

The principal components making up the inks used in the third aspect of the present invention are as described above. Besides, other water-soluble organic solvents, surfactants, pH adjustors, antifoaming agents, antiseptics and/or the like may be used in addition to the above components as needed.

Examples of the water-soluble organic solvents usable in the third aspect may include amides such as dimethylformamide and dimethylacetamide; ketones and ketone alcohols such as acetone and diacetone alcohol; ethers such as tetrahydrofuran and dioxane; N-methyl-2-pyrrolidone; 1,3-dimethyl-2-imidazolidinone; and the like.

Examples of the surfactants include anionic surfactants such as fatty acid salts, sulfuric ester salts of higher alcohols, sulfuric ester salts of liquid fatty oils and alkylallylsulfonates; and nonionic surfactants such as polyoxyethylene alkyl ethers, polyoxyethylene alkyl esters and polyoxyethylene sorbitan alkyl esters. These surfactants may be suitably chosen for either single use or combined use. The amount of the surfactants to be used may desirably be within a range of from 0.01 to 5% by weight based on the total weight of the ink. In this case, it is preferred that the amount of the surfactants added be determined in such a manner that the surface tension of the resulting ink is 35 dyne/cm or higher. If the surface tension is lower than this value, such an ink brings about undesirable situations such as slippage upon printing (defective ink-droplet impact) due to the wetting on the tip of a nozzle.

Examples of the pH adjustors may include various kinds of organic amines such as diethanolamine and triethanolamine, inorganic alkalis such as the hydroxides of alkali metals, for example, sodium hydroxide, lithium hydroxide, potassium hydroxide, etc., organic acids, and mineral acids.

Exemplary preparation processes of the inks used in the third aspect of this invention are described below.

In the case of each of the dye-containing inks, a dye, water and a water-soluble organic solvent are mixed with each other, and the resulting mixture is then filtered under pressure through a Teflon filter having an average pore size of 0.45 μm and deaerated to obtain an ink.

In the case of the pigment-containing ink, an aqueous solution containing at least a water-soluble resin, an amine or base, and water is first heated to 70° C. to completely dissolve the resin therein. At this time, if the concentration of the resin dissolved is too low, it may not be completely dissolved in some cases. Therefore, a solution containing the resin in a high concentration may be prepared in advance and then diluted to prepare a desired resin solution.

After a pigment and an aliphatic monohydric alcohol (ethanol or the like) are added to this solution to premix them, the resulting premix is subjected to a dispersion treatment. Any dispersing machine routinely used may be employed as a dispersing machine used in the dispersion treatment. Examples thereof may include ball mills making use of ceramic balls or steel balls, roll mills and sand mills making use of glass beads or ceramic beads.

Of these, high-speed sand mills are preferred. Examples thereof may include Super Mill, Sand Grinder, Beads Mill, Agitator Mill, Grain Mill, Dyno Mill, Pearl Mill, Coball Mill (all, trade names), etc. As beads used in a sand mill, glass beads, ceramic beads, zirconium beads and the like having a diameter of 1 mm to 1.5 mm are used.

If an example of conditions for preparing a dispersion for the ink used in the third aspect of the present invention is mentioned, the following conditions are preferred.

Dispersing machine: Sand Grinder (manufactured by Igarashi Kikai K. K.)

Grinding medium: glass beads or zirconium beads (diameter: 1 mm)

Packing rate of the grinding medium: 50% (by volume)

Grinding time: 3 to 4 hours.

The dispersion was further subjected to a centrifugal treatment (12,000 RPM, 15 to 20 minutes) to remove coarse particles into a dispersion of particles having a particle size of 100 nm to 200 nm. Incidentally, as the dispersing machine, may be used Pearl Mill (manufactured by Ashizawa K. K., discharging rate: 100 ml/min).

The total amount of the pigment and water-soluble resin in the dispersion may desirably be 5 to 30% by weight, preferably 10 to 30% by weight.

The reason for this is that the dispersion treatment cannot be conducted efficiently to reach an optimum dispersion state unless the pigment and water-soluble resin exist in the dispersion in a certain concentration or higher.

A water-soluble organic solvent, deionized water and the like are then added to the dispersion, and the resulting mixture is stirred for 1 hour, thereby preparing an ink.

Methods of obtaining a pigment having a desired particle size distribution may include procedures in which size of a grinding medium in a dispersing machine is made smaller, in which the packing rate of a grinding medium is made higher, in which processing time is made longer, in which discharging rate is made lower, and in which classification is conducted by filter, centrifugal separator or the like after grinding. Any combination thereof may also be included.

The fourth aspect of the invention will hereinafter be described in detail.

Inventors of the present invention have found the following facts as a result of energetic investigation of the relationship between the conditions of the surface of a recording medium, and the optical density of an image formed thereon.

That is, particles of pigment ink aggregate and remain on the surface of a recording medium immediately after the pigment ink reaches the surface of the recording medium. As a result, an image is formed. Therefore, if the surface condition of the recording member makes the ink dispersion unstable and makes the ink penetrate into the recording medium immediately, a satisfactory image density can be realized.

A so-called plain paper widely used in offices is categorized into acid paper and neutral paper each having various surface conditions to meet their purposes.

The design of ink for realizing a desired image density by making the ink dispersion condition to be unstable is contrary to the need for meeting the requirements for ink for use in the ink jet recording operation, such as the discharge stability, preservation stability and prevention of clogging at the fine leading portion of the nozzle.

The fourth aspect of the present invention uses a black pigment ink and color dye ink including cyan, magenta and yellow dye ink, wherein the black pigment ink and the color dye ink overlap each other on a recording medium.

As a result, the ink is instantaneously aggregated and fixed to the surface of the recording medium so that satisfactory image density is realized and a black image exhibiting excellent fastness can be formed. Further, color recording which uses the black pigment ink and cyan, magenta and yellow dye ink are able to prevent bleeding in the color boundary, that is, so-called "color bleeding". The supply of any one of yellow, magenta or cyan ink, the pH of which is adjusted to be 4 or less or which contains salt, prior to supplying black pigment ink improves the characteristics such as the density, fixing and the like while preventing influence of the hue of the black pigment ink. When color ink is continuously supplied adjacent to the black pigment ink, the pigment ink aggregates together with the color ink on the interface as described above. Therefore, the interface prevents mutual diffusion of ink which is present inside thereof. As a result, the boundary bleeding and the bleeding through the interface can be prevented. As described above, the present invention is significantly effective to raise the image density and to improve the fixing speed. Further, the quality of the color recorded image can be significantly improved.

The same pigment dye ink as described therefore is used in the present invention.

The dye ink according to the fourth aspect of the present invention contains at least the water-soluble dye, water and the water-soluble organic solvent.

The water-soluble dye may be a usual dye for use in the ink jet recording method, exemplified by: cyan ink such as C.I. Basic Blue 41, C.I. Basic Blue 75, C.I. Direct Blue 86, C.I. Direct Blue 199, C.I. Acid Blue 9; magenta ink such as C.I. Basic Red 27, C.I. Basic Red 46, C.I. Basic Red 29, C.I. Acid Red 35, C.I. Acid Red 37, yellow ink such as C.I. Basic Yellow 24, C.I. Basic Yellow 51, C.I. Basic Yellow 67, C.I. Direct Yellow 86, C.I. Direct Yellow 142 and C.I Acid Yellow 23. The foregoing materials are any one of acid, direct or basic dyes indicated on the color index. Another material that is not indicated in the color index may be used if it is a water-soluble dye.

The water-soluble organic solvent and the water are similar to the pigment ink.

In order to obtain desired physical property values, a surface active agent, antifoaming agent or antiseptic agent may be added if necessary.

The pH of the foregoing dye ink is adjusted to 4 or lower in order to enhance the aggregation of the pigment ink. The adjustment can be performed by a method in which an acid such as acetic acid or hydrochloric acid is added if necessary or a method using a basic dye.

If the pH of the dye ink is not made to be 4 or lower, the aggregation of the pigment ink can be enhanced by causing salt to be contained in the dye ink. If the salt is contained, the pH may, of course, be 4 or lower.

The salt is exemplified by: hydrochloric acid salt such as sodium chloride, potassium chloride, lithium chloride, ammonium chloride, calcium chloride, magnesium chloride or barium chloride; carbonic salt such as calcium carbonate, magnesium carbonate, barium carbonate, sodium carbonate, lithium carbonate or ammonium carbonate; acetate such as sodium acetate, potassium acetate or lithium acetate; sulfate such as sodium sulfate, potassium sulfate or aluminum sulfate; nitrate; sulfite; or nitrite. If a material can be dissolved in water and electrolytically dissociated, other materials may be employed.

No particular limitation is imposed on the recording paper used in the present invention, and plain paper, which is routinely used, is preferably used.

Figure 2:
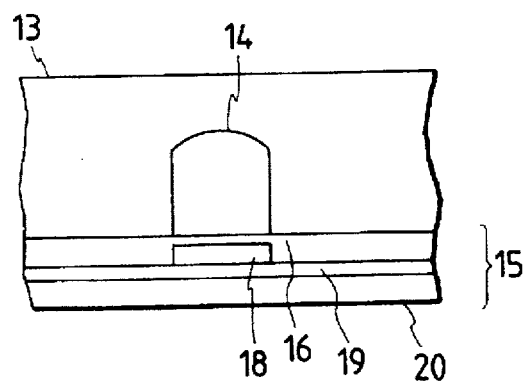
FIG. 2 is a transverse cross-sectional view of the head of the ink-jet recording apparatus.
Figure 3:
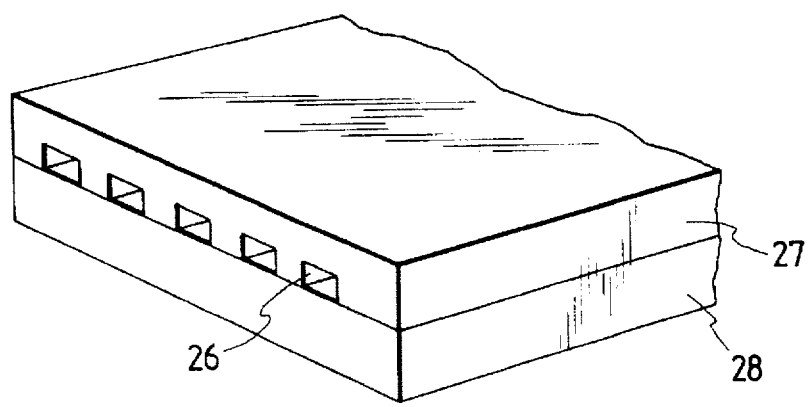
FIG. 3 is a perspective view of the appearance of another head of the ink-jet recording apparatus.

Recording apparatus useful in the practice of the present invention will now be described. In the present invention, an ink-jet recording system in which a recording signal is applied to an ink in a recording head to eject out droplets of the ink by the thermal energy generated is suitably used. A recording head making use of an electromechanical transducer may also be used. Examples of the construction of a head, which is a main component of the apparatus making use of thermal energy, are illustrated in FIGS. 1, 2 and 3.

A head 13 is formed by bonding a glass, ceramic, plastic plate or the like having a groove through which an ink is passed, to a heating head 15, which is used for thermal recording and has a heating resistor (the drawing shows a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

A recording ink 21 comes up to an ejection orifice 22 and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24. FIG. 3 schematically illustrates a multi-head composed of an array of a number of heads as shown in FIG. 1. The multi-head is formed by closely bonding a glass plate or the like 27 having a number of channels to a heating head 28 similar to the head as illustrated in FIG. 1.

Incidentally, FIG. 1 is a cross-sectional view of the head 13 taken along the flow path of the ink, and FIG. 2 is a cross-sectional view taken along line A–B in FIG. 1.

Figure 4:
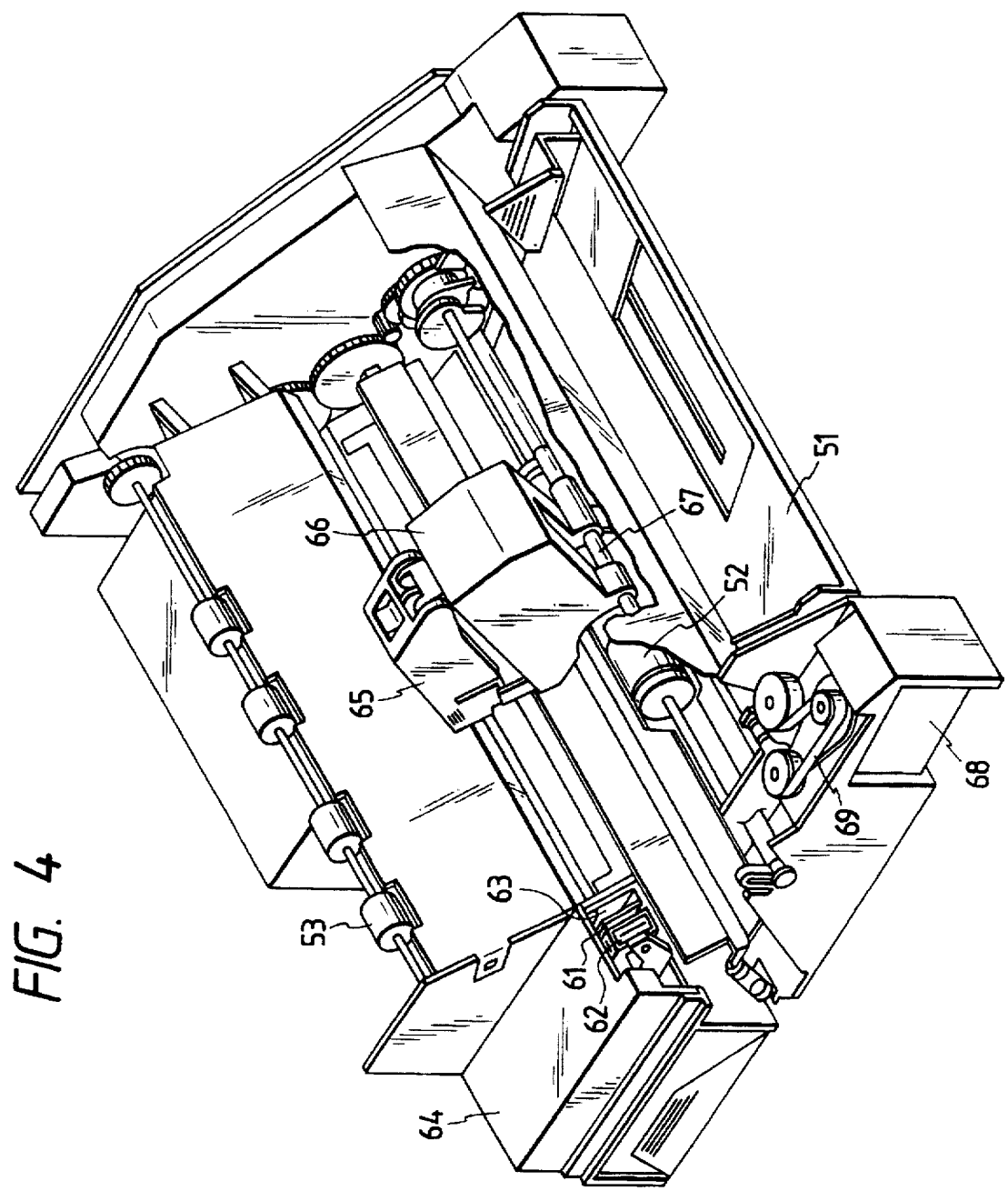
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head makes a record, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
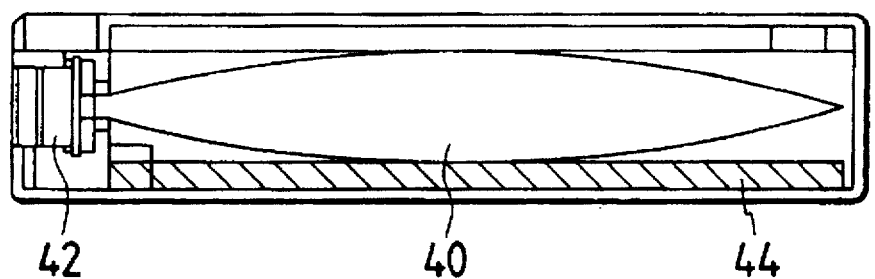
FIG. 5 is a longitudinal cross-sectional view of an ink cartridge.

FIG. 5 illustrates an exemplary ink cartridge in which an ink fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

It is preferred that the ink container portion is formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
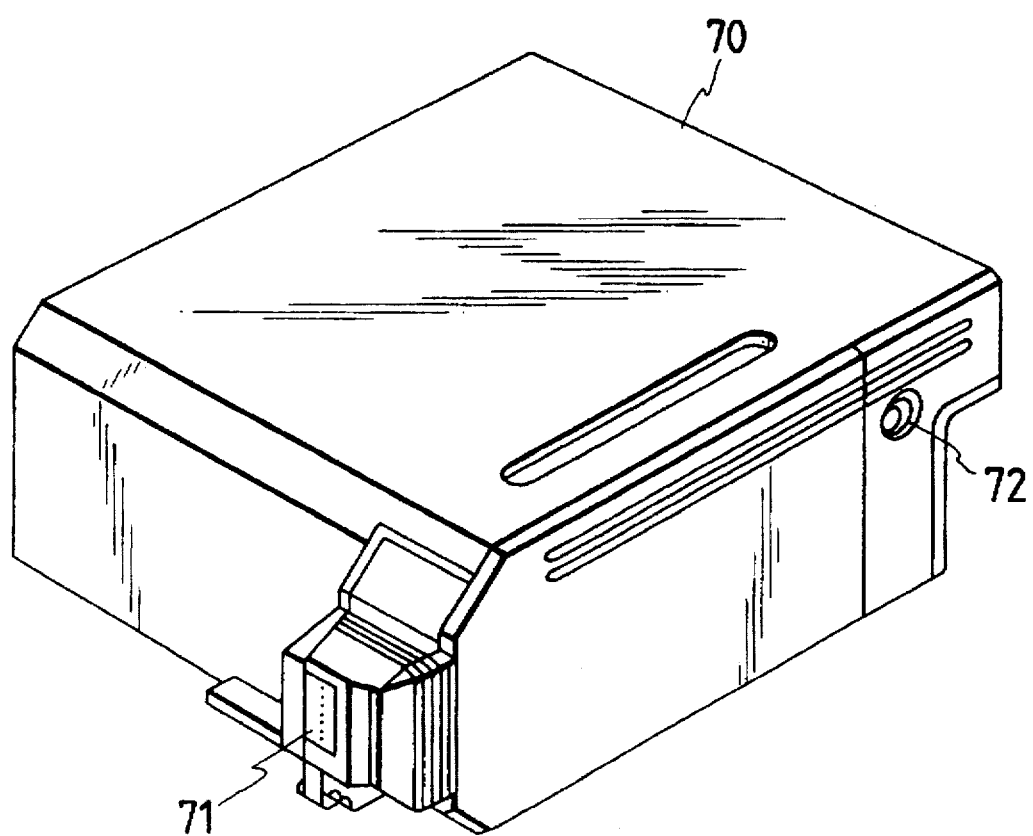
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. For example, polyurethane may be used as a material for the ink-absorbing member. Reference numeral 72 indicates an air passage for communicating the interior of the recording unit 70 with the atmosphere. This recording unit 70 can be used in place of the recording head shown in FIG. 3, and is detachably installed on the carriage 66. Incidentally, in the recording apparatus used in the present invention, the ink-jet recording apparatus in which heat energy is caused to act on an ink to eject out droplets of the ink has been described by way of example. However, the present invention can also be used in other ink-jet recording apparatus such as a piezo-system making use of a piezo-electric element.

Figure 7:
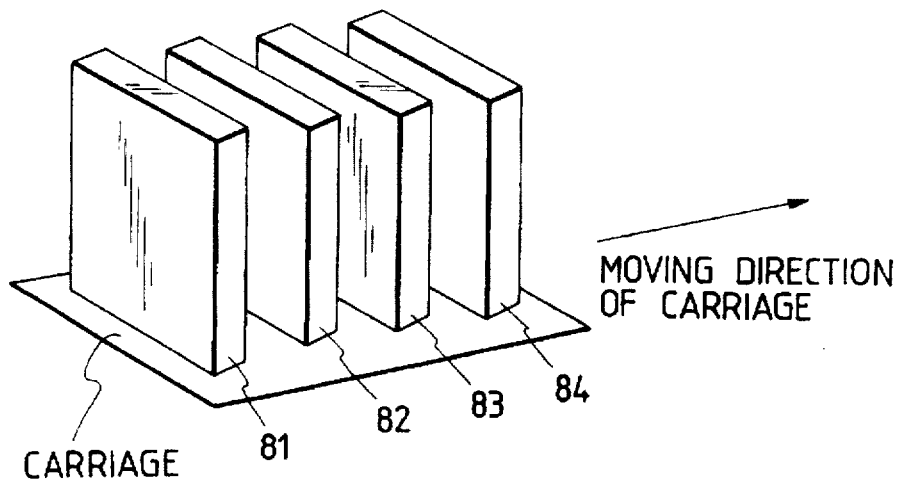
FIG. 7 is a perspective view illustrating a recording part used in examples of the present invention, in which a plurality of recording heads is arranged.
Figure 8:
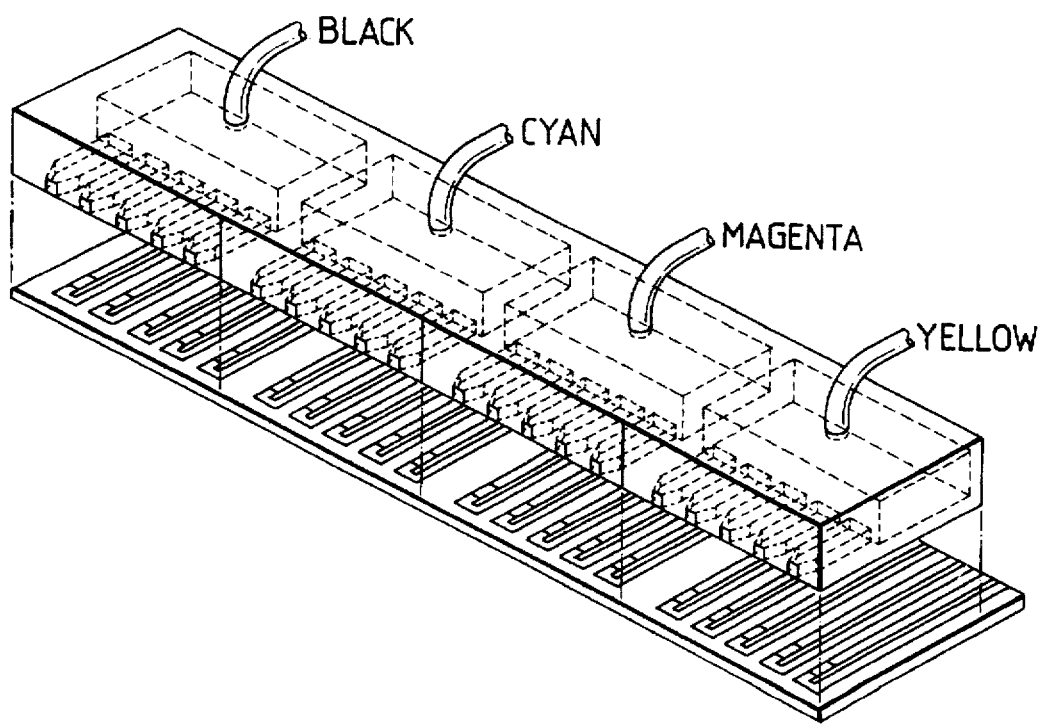
FIG. 8 is a perspective view of another recording head used in the present invention.

In the case where the recording process according to the present invention is carried out, for example, a recording apparatus in which four recording heads, each of which has been illustrated in FIG. 3, are arranged on a carriage, is used. An example thereof is illustrated in FIG. 7. Reference numerals 81, 82, 83 and 84 indicate recording heads for ejecting out recording inks of yellow, magenta, cyan and black colors, respectively. The heads are arranged in the above-described recording apparatus and serve to eject out the recording inks of the different colors according to recording signals. FIG. 7 shows the case where the four recording heads have been used. However, the present invention is not limited thereto. As shown in FIG. 8, preference is given even to the case where the flow paths of the yellow, magenta, cyan and black inks are separately provided in one recording head.

The present invention will hereinafter be described more specifically by the following examples and comparative example. Incidentally, all designations of "part" or "parts" and "%" as will be used in the following examples mean part or parts by weight and % by weight unless expressly noted.

[First Aspect]

EXAMPLES 1 TO 5

First of all, the following respective components were mixed into solutions, and the resultant solutions were then filtered under pressure through a membrane filter (Fluoropore Filter, trade name: product of Sumitomo Electric Industries, Ltd.) having a pore size of 0.22 μm, thereby obtaining sets of Color Inks (1) through (5) of yellow, magenta and cyan colors according to Examples 1 to 5, respectively. Besides, Black Inks (1) to (5) according to Examples 1 to 5, respectively, were prepared in accordance with the procedure described below in detail. Composition of Color Inks (1): Yellow:

| C.I. Direct Yellow 86 | 2 parts |
|---|---|
| Ethylene oxide adduct of lauryl alcohol (number of moles added: 10) | 0.5 part |
| Diethylene glycol | 25 parts |
| Water | 72.5 parts |

Magenta:

The same composition as that of the yellow ink except that 3 parts of C.I. Acid Red 35 were used as a dye in place of 2 parts of C.I. Direct Yellow 86, and proportions of diethylene glycol and water were changed to 30 parts and 66.5 parts, respectively.

Cyan:

The same composition as that of the yellow ink except that C.I. Direct Blue 199 was used as a dye in place of C.I. Direct Yellow 86, and proportions of diethylene glycol and water were changed to 30 parts and 67 parts, respectively.

Black Ink (1):

| Styrene-acrylic acid-ethyl acrylate copolymer (acid value: 140, weight average molecular weight: 5,000) | 1.5 parts |
|---|---|
| Monoethanolamine | 1 part |
| Deionized water | 81.5 parts |
| Diethylene glycol | 5 parts |

The above components were mixed, and heated to 70° C. in a water bath to completely dissolve the resin therein. To this solution, were added 10 parts of carbon black (MCF 88, product of Mitsubishi Chemical Industries Limited) and 1 part of isopropyl alcohol to premix them for 30 minutes. Thereafter, the resulting premix was subjected to a dispersion treatment under the following conditions:

Dispersing machine: Sand Grinder (manufactured by Igarashi Kikai K. K.)

Grinding medium: zirconium beads (diameter: 1 mm)

Packing rate of the grinding medium: 50% (by volume)

Grinding time: 3 hours.

The dispersion was further subjected to a centrifugal treatment (12,000 RPM, 20 minutes) to remove coarse particles into a dispersion.

(Preparation of black ink)

| Dispersion described above | 25 parts |
|---|---|
| Glycerol | 10 parts |
| Ethylene glycol | 5 parts |
| N-Methylpyrrolidone | 3 parts |
| Isopropyl alcohol | 2 parts |
| Deionized water | 55 parts |

The above components were mixed to prepare an ink. Composition of Color Inks (2):

Yellow:

| C.I. Direct Yellow 142 | 2 parts |
|---|---|
| Ethylene oxide adduct of nonyl phenol (number of moles added: 18) | 5 parts |
| Diethylene glycol | 30 parts |
| Water | 63 parts |

Magenta:

The same composition as that of the yellow ink except that 3 parts of C.I. Acid Red 35 were used as a dye in place of 2 parts of C.I. Direct Yellow 142, and a proportion of water was changed to 62 parts.

Cyan:

The same composition as that of the yellow ink except that C.I. Direct Blue 199 was used as a dye in place of C.I. Direct Yellow 86.

Black Ink (2):

| Styrene-maleic acid-maleic half ester copolymer (acid value: 200, weight average molecular weight: 12,000) | 4 parts |
|---|---|
| Aminomethylpropanol | 2 parts |
| Deionized water | 74 parts |
| Diethylene glycol | 5 parts |

The above components were mixed, and heated to 70° C. in a water bath to completely dissolve the resin therein. To this solution, were added 15 parts of carbon black (MCF 88, product of Mitsubishi Chemical Industries Limited) to premix them for 30 minutes. Thereafter, the resulting premix was subjected to a dispersion treatment under the following conditions:

Dispersing machine: Pearl Mill (manufactured by Ashizawa K. K.)

Grinding medium: glass beads (diameter: 1 mm)

Packing rate of the grinding medium: 50% (by volume)

Discharging rate: 100 ml/min.

The dispersion was further subjected to a centrifugal treatment (12,000 RPM, 20 minutes) to remove coarse particles into a dispersion.

(Preparation of black ink)

| Dispersion described above | 25 parts |
|---|---|
| Glycerol | 10 parts |
| Ethylene glycol | 5 parts |
| Thiodiglycol | 5 parts |
| Ethanol | 5 parts |
| Deionized water | 50 parts |

The above components were mixed and adjusted with aminomethylpropanol to give a pH of 8 to 10, thereby preparing an ink. Composition of Color Inks (3):

Yellow:

| C.I. Direct Yellow 86 | 2 parts |
|---|---|
| Ethylene oxide-propylene oxide copolymer (number of moles added: 7) | 3 parts |
| Ethylene glycol | 10 parts |
| Glycerol | 10 parts |
| Urea | 5 parts |
| Thiodiglycol | 5 parts |
| Water | 65 parts |

Magenta:

| C.I. Acid Red 35 | 3 parts |
|---|---|
| Ethylene oxide-propylene oxide copolymer (number of moles added: 7) | 3 parts |
| Diethylene glycol | 30 parts |
| Water | 64 parts |

Cyan:

| C.I. Direct Blue 199 | 2 parts |
|---|---|
| Ethylene oxide-propylene oxide copolymer (number of moles added: 7) | 3 parts |
| Triethylene glycol | 15 parts |
| Diethylene glycol | 15 parts |
| Water | 65 parts |

Black Ink (3):

| Styrene-acrylic acid-ethyl acrylate copolymer (acid value: 140, weight average molecular weight: 5,000) | 3 parts |
|---|---|
| Monoethanolamine | 1 part |
| Deionized water | 76 parts |
| Ethylene glycol | 5 parts |

The above components were mixed, and heated to 70° C. in a water bath to completely dissolve the resin therein. To this solution, were added 15 parts of carbon black (MCF 88, product of Mitsubishi Chemical Industries Limited) to premix them for 30 minutes. Thereafter, the resulting premix was subjected to a dispersion treatment under the following conditions:

Dispersing machine: Sand Grinder (manufactured by Igarashi Kikai K. K.)

Grinding medium: zirconium beads (diameter: 1 mm)

Packing rate of the grinding medium: 50% (by volume)

Grinding time: 3 hours.

The dispersion was further subjected to a centrifugal treatment (12,000 RPM, 20 minutes) to remove coarse particles into a dispersion.

(Preparation of black ink)

| Dispersion described above | 25 parts |
|---|---|
| Glycerol | 10 parts |
| Ethylene glycol | 3 parts |
| Thiodiglycol | 7 parts |
| Ethyl alcohol | 4 parts |
| Deionized water | 51 parts |

The above components were mixed to prepare an ink.
Composition of Color Inks (4):

Yellow:

| C.I. Direct Yellow 86 | 3 parts |
|---|---|
| Ethylene oxide adduct of acetylene glycol (number of moles added: 10) | 1 part |
| Glycerol | 10 parts |
| Thiodiglycol | 5 parts |
| Urea | 5 parts |
| Water | 76 parts |

Magenta:

The same composition as that of the yellow ink except that a magenta dye represented by the following formula was used in place of C.I. Direct Yellow 86.

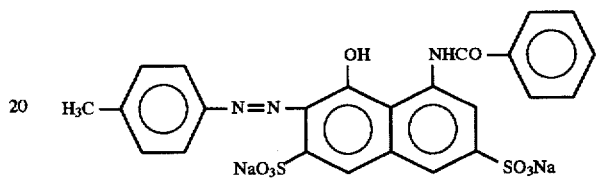

Cyan:

The same composition as that of the yellow ink except that C.I. Direct Blue 199 was used as a dye in place of C.I. Direct Yellow 86.

Black Ink (4):

| Dispersion used in Black Ink (1) | 25 parts |
|---|---|
| Thiodiglycol | 7 parts |
| Ethylene glycol | 5 parts |
| Glycerol | 10 parts |
| Ethyl alcohol | 4 parts |
| Noigen ET-150E (product of Dai-ichi Kogyo Seiyaku Co., Ltd.) | 0.1 part |
| Deionized water | 48.9 parts |

The above components were mixed to prepare an ink.
Composition of Color Inks (5):

Yellow:

| C.I. Direct Yellow 86 | 2 parts |
|---|---|
| Decaglycerol monolaurate | 15 parts |
| Ethylene glycol | 20 parts |
| Water | 63 parts |

Magenta:

| C.I. Acid Red 35 | 2 parts |
|---|---|
| Decaglycerol monolaurate | 15 parts |
| Polyethylene glycol | 20 parts |
| Water | 63 parts |

Cyan:

| C.I. Direct Blue 199 | 2 parts |
|---|---|
| Decaglycerol monolaurate | 15 parts |
| Glycerol | 10 parts |
| Ethyl alcohol | 3 parts |
| Water | 70 parts |

Black Ink (5):

| Dispersion used in Black Ink (2) | 27 parts |
|---|---|
| Glycerol | 8 parts |
| Ethylene glycol | 5 parts |
| Thiodiglycol | 10 parts |
| Ethanol | 5 parts |
| Deionized water | 45 parts |

The above components were mixed and adjusted with aminomethylpropanol to give a pH of 8 to 10, thereby preparing an ink.

Using the thus-obtained sets of Color Inks (1) to (5) and Black Inks (1) to (5), recording was then conducted on commercially-available paper for copying, or bond paper, thereby obtaining the results of Examples 1 to 5. As an ink-jet recording apparatus, was used a recording apparatus similar to that shown in FIG. 4. Color images were formed using 4 recording heads as illustrated in FIG. 7. Incidentally, the individual recording heads used were the same as that used in BJC 820 (trade name, ink-jet printer manufactured by Canon Inc.). The drive conditions of each of the recording heads, i.e., conditions for energizing a heater were as follows:

Voltage applied: 28 V

Pulse length: 3.2 μsec

Drive frequency: 5 kHz.

In FIG. 7, the black, cyan, magenta and yellow inks of each set were filled in the recording heads 84, 83, 82 and 81, respectively.

Comparative Example 1

Recording was conducted in the same manner as in Example 2 except that a black ink, in which 3 parts of C.I. Food Black 1 was added in place of the pigment dispersion in Black Ink (2), and a proportion of deionized water was changed to 72 parts, was used.

The recorded samples in Examples 1 to 5 and Comparative Example 1 were evaluated in bleeding between the color inks, bleeding between the color ink and the black ink, and quality of black-colored characters. The results are shown in Table 1.

Incidentally, the evaluation of the recorded samples was conducted in accordance with the following methods.

(Resistance to bleeding)

Solid prints of the respective inks of yellow, magenta, cyan and black colors were recorded in contiguity with one another on commercially-available paper for copying, or bond paper to observe whether color bleeding and/or uneven color mixing occurred at boundary areas between the color inks and between each color ink and the black ink, or not. The resistance to bleeding was ranked in accordance with the following standard:

A: Neither color bleeding nor uneven color mixing occurred;

B: Color bleeding and/or uneven color mixing occurred to a slight extent, which would cause no problem in actual use; and C: Color bleeding and uneven color mixing occurred, which would cause problems in actual use.

(Quality of black-colored characters)

English characters and numerals were recorded on commercially-available paper for copying, or bond paper. The resultant recorded samples were magnified through a microscope to observe the sharpness and resolution of the characters. The quality of black-colored characters was ranked in accordance with the following standard:

A: Edges of characters were sharp and resolution was good;

B: Feathering slightly occurred at edges of characters, which would cause no problem in actual use; and C: Resolution of characters was poor, and feathering occurred, which would cause problems in actual use.

TABLE 1

|  | Color inks used | Black ink used | Resistance to bleeding between color inks | Resistance to bleeding between color and black inks | Quality of black-colored characters |
|---|---|---|---|---|---|
| Ex. 1 | (1) | (1) | A | A | A |
| Ex. 2 | (2) | (2) | A | A | A |
| Ex. 3 | (3) | (3) | A | A | A |
| Ex. 4 | (4) | (4) | A | A | A |
| Ex. 5 | (5) | (5) | A | A | A |
| Comp. Ex. 1 | (2) | *1 | A | C | B |

*1: Described in the text.

As described above, the use of the recording process and recording apparatus according to the first aspect of the present invention permits the provision of high-quality color images on plain paper, said images being high in image density and evenness of image density, good in quality of black-colored characters and free from any bleeding.

[Second Aspect]

EXAMPLES 6 TO 17

Black Inks B1 to B3 were first prepared in accordance with the procedure described below.

1) Preparation of Black Ink B1:

(Preparation of pigment dispersion)

| Styrene-acrylic acid-butyl acrylate copolymer (acid value: 116, weight average molecular weight: 3,700) | 1.5 parts |
|---|---|
| Monoethanolamine | 1 part |
| Deionized water | 81.5 parts |
| Diethylene glycol | 0 parts |

The above components were mixed, and heated to 70° C. in a water bath to completely dissolve the resin therein. To this solution, were added 10 parts of carbon black (MCF 88, product of Mitsubishi Chemical Industries Limited) and 1 part of isopropyl alcohol to premix them for 30 minutes. Thereafter, the resulting premix was subjected for 3 hours to a dispersion treatment making use of zirconium beads having a diameter of 1 mm, and further to a centrifugal treatment (12,000 RPM, 20 minutes) to remove coarse particles into a dispersion.

(Preparation of ink)

| Dispersion described above | 10 parts |
|---|---|
| Glycerol | 3 parts |
| Diethylene glycol | 12 parts |
| N-Methylpyrrolidone | 7 parts |
| Isopropyl alcohol | 3 parts |
| Deionized water | 65 parts |

The above components were mixed and adjusted with monoethanolamine to give a pH of 8 to 10, thereby obtaining Black Ink B1.

2) Preparation of Black Ink B2:

| Styrene-maleic acid-maleic half ester copolymer (acid value: 200, weight average molecular weight: 12,000) | 4 parts |
| --- | --- |
| Aminomethylpropanol | 2 parts |
| Deionized water | 74 parts |
| Diethylene glycol | 5 parts |

The above components were mixed, and heated to 70° C. in a water bath to completely dissolve the resin therein. To this solution, were added 15 parts of carbon black (MCF 88, product of Mitsubishi Chemical Industries Limited) to premix them for 30 minutes. Thereafter, the resulting premix was subjected to a dispersion treatment making use of glass beads having a diameter of 1 mm, and further to a centrifugal treatment (12,000 RPM, 20 minutes) to remove coarse particles into a dispersion.
(Preparation of ink)

| Dispersion described above | 20 parts |
| --- | --- |
| Glycerol | 10 parts |
| Ethylene glycol | 6 parts |
| Ethanol | 5 parts |
| Deionized water | 61.5 parts |

The above components were mixed and adjusted with aminomethylpropanol to give a pH of 8 to 10, thereby obtaining Black Ink B2.
3) Preparation of Black Ink B3:
(Preparation of pigment dispersion)

| Sodium salt of β-naphthalene-sulfonic acid-formamide condensate | 1.5 parts |
| --- | --- |
| Deionized water | 81.5 parts |
| Ethylene glycol | 5 parts |

The above components were mixed, and heated to 70° C. in a water bath to completely dissolve the resin therein. To this solution, were added 11 parts of carbon black (S170, product of Degussa) and 1 part of isopropyl alcohol to premix them for 60 minutes. Thereafter, the resulting premix was subjected for 10 hours to a dispersion treatment making use of zirconium beads having a diameter of 0.5 mm, and further to a centrifugal treatment (12,000 RPM, 20 minutes) to remove coarse particles into a dispersion.
(Preparation of ink)

| Dispersion described above | 10 parts |
| --- | --- |
| Glycerol | 12 parts |
| Diethylene glycol | 10 parts |
| 2-Pyrrolidone | 10 parts |
| Isopropyl alcohol | 3 parts |
| Deionized water | 55 parts |

The above components were mixed and adjusted with monoethanolamine to give a pH of 8 to 10, thereby obtaining Black Ink B3.

Next, the following respective components were mixed into solutions, and the resultant solutions were then filtered under pressure through a membrane filter (Fluoropore Filter, trade name: product of Sumitomo Electric Industries, Ltd.) having a pore size of 0.22 μm, thereby preparing Recording Ink Y1 to Y4, M1 to M4, and C1 to C4 of yellow, magenta and cyan colors, respectively.

Yellow Ink Y1:

| C.I. Direct Yellow 86 | 2 parts |
| --- | --- |
| Ethylene oxide adduct of lauryl alcohol (number of moles added: 10) | 0.5 part |
| Diethylene glycol | 25 parts |
| Water | 68.5 parts |
| $K_2CO_3$ | 4 parts |

Magenta Ink M1:
The same composition as that of Yellow Ink Y1 except that 3 parts of C.I. Acid Red 35 were used as a dye in place of 2 parts of C.I. Direct Yellow 86, and a proportion of water was changed to 67.5 parts.
Cyan Ink C1:
The same composition as that of Yellow Ink Y1 except that 2.5 parts of C.I. Direct Blue 199 was used as a dye in place of 2 parts of C.I. Direct Yellow 86, and a proportion of water was changed to 68 parts.
Yellow Ink Y2:

| C.I. Acid Yellow 142 | 2.5 parts |
| --- | --- |
| Polyoxyethylene (10) polyoxypropylene (7) butyl ether | 3 parts |
| Ethylene glycol | 20 parts |
| Glycerol | 10 parts |
| NaCl | 5 parts |
| Water | 59.5 parts |

Magenta Ink M2:
The same composition as that of Yellow Ink Y2 except that 3.0 parts of C.I. Direct Red 227 were used as a dye in place of 2.5 parts of C.I. Acid Yellow 142, and a proportion of water was changed to 59 parts.
Cyan Ink C2:
The same composition as that of Yellow Ink Y2 except that C.I. Direct Blue 199 was used as a dye in place of C.I. Acid Yellow 142.
Yellow Ink Y3:

| C.I. Direct Yellow 86 | 2.5 parts |
| --- | --- |
| Ethylene oxide adduct of acetylene glycol (number of moles added: 10) | 5 parts |
| Glycerol | 7.5 parts |
| Thiodiglycol | 7.5 parts |
| Urea | 7.5 parts |
| Lithium acetate | 5 parts |
| Water | 65 parts |

Magenta Ink M3:
The same composition as that of Yellow Ink Y3 except that 3.5 parts of C.I. Acid Red 289 were used as a dye in place of 2.5 parts of C.I. Direct Yellow 86, and a proportion of water was changed to 64 parts.
Cyan Ink C3:
The same composition as that of Yellow Ink Y3 except that 3.5 parts of C.I. Acid Blue 9 was used as a dye in place of 2.5 parts of C.I. Direct Yellow 86, and a proportion of water was changed to 64 parts.
Yellow Ink Y4:

| C.I. Direct Yellow 86 | 2 parts |
| --- | --- |
| Sodium salt of lauryl sulfate | 0.2 part |
| Ethylene glycol | 15 parts |
| Thiodiglycol | 15 parts |

-continued

| | |
|---|---|
| NaNO₃ | 4 parts |
| Water | 63.8 parts |

Magenta Ink M4:

The same composition as that of Yellow Ink Y4 except that 3.5 parts of C.I. Acid Red 35 were used as a dye in place of 2 parts of C.I. Direct Yellow 86, and a proportion of water was changed to 62.3 parts.

Cyan Ink C4:

The same composition as that of Yellow Ink Y4 except that 3 parts of C.I. Acid Blue 9 was used as a dye in place of 2 parts of C.I. Direct Yellow 86, and a proportion of water was changed to 62.8 parts.

Using the thus-obtained recording inks in combination, recording was then conducted on commercially-available paper for copying, or bond paper, thereby obtaining the results of Examples 6 to 17. As an ink-jet recording apparatus, was used a recording apparatus similar to that shown in FIG. 4. Color images were formed using 4 recording heads as illustrated in FIG. 7. Incidentally, the individual recording heads used were the same as that used in BJC 820 (trade name, ink-jet printer manufactured by Canon Inc.). The drive conditions of each of the recording heads, i.e., conditions for energizing a heater, were as follows:

Voltage applied: 28 V

Pulse length: 3.2 μsec

Drive frequency: 5 kHz.

The recorded samples in Examples 6 to 17 were evaluated in four points of record density, bleeding between the color inks, bleeding between the color ink and the black ink, and quality of black-colored characters. The results are shown in Table 2.

C: Record density as to the ink of each color was lower than 1.15.

(Resistance to bleeding)

The resistance to bleeding was evaluated by the same method as described in the first aspect.

(Quality of black-colored characters)

The quality of black-colored characters was evaluated by the same method as described in the first aspect.

As described above, the use of the recording process and recording apparatus according to the second aspect of the present invention permits the provision of high-quality color images on plain paper, said images being high in image density and evenness of image density, good in quality of black-colored characters and free from any bleeding.

[Third Aspect]

EXAMPLE 18

Black ink:

| | |
|---|---|
| Carbon black (MCF-88, product of Mitsubishi Chemical Industries Limited) | 3 parts |
| Resin A | 0.8 part |
| Monoethanolamine | 0.3 part |
| Glycerol | 8 parts |
| Ethylene glycol | 13 parts |
| Diethylene glycol | 3 parts |
| Ethanol | 4.9 parts |
| Deionized water | 67.0 parts |

TABLE 2

| | Yellow ink | Magenta ink | Cyan ink | Black ink | Image density | Bleeding between color inks | Bleeding between color and black inks | Quality of black-colored characters |
|---|---|---|---|---|---|---|---|---|
| Ex. 6 | Y1 | M1 | C1 | B1 | A | A | A | A |
| EX. 7 | Y1 | M1 | C1 | B2 | A | A | A | A |
| Ex. 8 | Y1 | M1 | C1 | B3 | A | A | A | A |
| Ex. 9 | Y2 | M2 | C2 | B1 | A | A | A | A |
| Ex. 10 | Y2 | M2 | C2 | B2 | A | A | A | A |
| Ex. 11 | Y2 | M2 | C2 | B3 | A | A | A | A |
| Ex. 12 | Y3 | M3 | C3 | B1 | A | A | A | A |
| Ex. 13 | Y3 | M3 | C3 | B2 | A | A | A | A |
| Ex. 14 | Y3 | M3 | C3 | B3 | A | A | A | A |
| Ex. 15 | Y4 | M4 | C4 | B1 | A | A | A | A |
| Ex. 16 | Y4 | M4 | C4 | B2 | A | A | A | A |
| Ex. 17 | Y4 | M4 | C4 | B3 | A | A | A | A |

Incidentally, the evaluation of the recorded samples of the recording inks were conducted in accordance with the following methods.

(Record density)

After English characters and numerals and solid prints were recorded on commercially-available paper for copying, or bond paper, and the resulting recorded samples were left over for 1 hour, their record densities were determined by a Macbeth RD915 (trade name; manufactured by Macbeth Company) and ranked in accordance with the following standard:

A: Record density as to the ink of each color was higher than 1.25;

B: Record density as to the ink of each color was 1.15 to 1.25; and

Yellow ink:

| | |
|---|---|
| Exemplified Dye Y-1 | 3 parts |
| Diethylene glycol | 28 parts |
| Acetylenol EH | 0.2 part |
| Deionized water | 68.8 parts |

Magenta ink:

The same composition as that of the yellow ink except that the exemplified Dye M-1 was used as a dye in place of the dye of the yellow ink.

Cyan ink:

The same composition as that of the yellow ink except that the exemplified Dye Cy-1 was used as a dye in place of the dye of the yellow ink.

EXAMPLE 19

Black ink:

| Carbon black (#1000, product of Mitsubishi Chemical Industries Limited) | 3 parts |
|---|---|
| Resin A | 0.3 part |
| Aminomethylpropanol | 0.5 part |
| Glycerol | 10 parts |
| Ethylene glycol | 7 parts |
| Diethylene glycol | 3 parts |
| Ethanol | 4.2 parts |
| Deionized water | 72.0 parts |

Yellow ink:

| Exemplified Dye Y-2 | 2 parts |
|---|---|
| Diethylene glycol | 25 parts |
| N-Methylpyrrolidone | 3 parts |
| Acetylenol EH | 0.2 part |
| Deionized water | 69.8 parts |

Magenta ink:

| Exemplified Dye M-2 | 3 parts |
|---|---|
| Diethylene glycol | 28 parts |
| Acetylenol EH | 0.2 part |
| Deionized water | 68.8 parts |

Cyan ink:

The same composition as that of the magenta ink except that the exemplified Dye Cy-2 was used as a dye in place of the dye of the magenta ink.

EXAMPLE 20

Black ink:

| Carbon black (SB6, product of Degussa) | 3 parts |
|---|---|
| Resin B | 0.8 part |
| Aminomethylpropanol | 0.8 part |
| Glycerol | 6 parts |
| Ethylene glycol | 12 parts |
| Diethylene glycol | 3 parts |
| Ethanol | 5.4 parts |
| Deionized water | 69.0 parts |

Yellow ink:

| Exemplified Dye Y-3 | 3 parts |
|---|---|
| Diethylene glycol | 28 parts |
| Acetylenol EH | 0.2 part |
| Deionized water | 68.8 parts |

Magenta ink:

The same composition as that of the yellow ink except that the exemplified Dye M-3 was used as a dye in place of the dye of the yellow ink.

Cyan ink:

The same composition as that of the yellow ink except that the exemplified Dye Cy-2 was used as a dye in place of the dye of the yellow ink.

The Resins A and B used in the above-described Examples 18 to 20 have properties shown in Table 3.

TABLE 3

|  | Acid value | Molecular weight | Ratio of monomers (styrene:acrylic acid:ethyl acrylate) |
|---|---|---|---|
| Resin A | 174 | 18000 | 59:28.5:12.5 |
| Resin B | 194 | 16500 | 59:28.5:12.5 |

EXAMPLE 21

A combination of the same inks as in Example 18 except that the exemplified Dye M-4 was used in place of the exemplified Dye M-1 used in the magenta ink in Example 18.

EXAMPLE 22

A combination of the same inks as in Example 19 except that the exemplified Dye M-5 was used in place of the exemplified Dye M-2 used in the magenta ink in Example 19.

EXAMPLE 23

A combination of the same inks as in Example 20 except that the exemplified Dye M-6 was used in place of the exemplified Dye M-3 used in the magenta ink in Example 20.

Using these inks of Examples 18 to 23, color images were formed by an ink-jet recording system, and evaluated in the following points. The results of the evaluation are shown in Table 4.

(1) Print quality:

Using BJC 440 (manufactured by Canon Inc.) as a printer and two kinds of paper for copying, NP-DRY (product of Canon Inc.) and XEROX 4024 as plain paper for printing, printing was conducted. The resulting images were observed by naked eyes to evaluate the images in bleeding at boundary areas between the inks of different colors, and color brightness in accordance with the following standards.

(Water resistance)

A: Good;

B: Not so good; and

C: Poor.

(Bleeding at boundary areas)

A: Boundary bleeding scarcely occurred;

B: Boundary bleeding occurred at areas of overlap printing; and

C: Bleeding exceedingly occurred even at boundary portions between single-colored areas.

(Color brightness of print)

A: Bright image;

B: Somewhat dull image; and

C: Dull image.

TABLE 4

|  | Water resistance | Resistance to bleeding | Color brightness |
|---|---|---|---|
| Example 18 | A | A | A |
| Example 19 | A | A | A |
| Example 20 | A | A | A |
| Example 21 | A | A | A |
| Example 22 | A | A | A |
| Example 23 | A | A | A |

According to the third aspect of the present invention, as described above, all the coloring materials used are of the same level and excellent in storage stability in solvents. Therefore, they possess suitability for water-based inks used in the common ink-jet system, in particular, good ejectability in the thermal-jet system, and have excellent performance well-balanced for not only coated paper, but also plain paper, and hence can provide color images high in quality.

EXAMPLE 24 to 35

(1) Preparation of Black Ink B1
Composition of Pigment Dispersion Liquid

| | |
|---|---|
| Styrene-acrylic acid-butyl acrylate copolymer (acid value: 116, weight average molecular weight: 3700) | 1.5 parts |
| Monoethanol amine | 1 part |
| Ion exchanged water | 81.5 parts |
| Diethylene glycol | 5 parts |

The foregoing components were mixed, and heated to 70° C. in a water bath so that the resin was dissolved completely. Then, 10 parts of carbon black (MCF88 manufactured by Mitsubishi Kasei) and 1 part of isopropyl alcohol were added, premixed for 30 minutes, and dispersed by using zirconium beads, the diameter of which was 1 mm, for 3 hours, and then a centrifugal separation process (12000 rpm for 20 minutes) was performed to remove coarse and large particles so that dispersant 1 was obtained.

Composition of Black ink B1

| | |
|---|---|
| Dispersant | 10 parts |
| Glycerine | 3 parts |
| Dimethylene glycol | 13 parts |
| n-methyl pyrrolidone | 6 parts |
| isopropyl alcohol | 4 parts |
| Ion exchanged water | 64 parts |

The foregoing components were mixed, monoethanol amine was added to make the pH to be 8 to 10, so that black ink B1 was obtained.

(2) Preparation of Black ink B2
Composition of Pigment Dispersion Liquid

| | |
|---|---|
| Styrene-maleic acid-maleic acid half ester copolymer (acid value: 200, weight average molecular weight: 12000) | 4 parts |
| Aminomethyl propanol | 2 parts |
| Ion exchanged water | 74 parts |
| Diethylene glycol | 5 parts |

The foregoing components were mixed, and heated to 70° C. in a water bath so that the resin was dissolved completely. Then, 15 parts of carbon black (MCF88 manufactured by Mitsubishi Kasei) were added, premixed for 30 minutes, and dispersed by using glass beads, the diameter of which was 1 mm, for 3 hours, and then a centrifugal separation process (12000 rpm for 20 minutes) was performed to remove coarse and large particles so that dispersant 2 was obtained.

Composition of Black Ink B2

| | |
|---|---|
| Dispersant 2 | 20 parts |
| Thiodiglycol | 5 parts |
| Glycerine | 10 parts |
| Ethanol | 5 parts |
| Ion exchanged water | 61.5 parts |

The foregoing components were mixed, monomethyl propanol was added to make the pH to be 8 to 10, so that black ink B2 was obtained.

(3) Composition of Pigment Dispersion Liquid

| | |
|---|---|
| Sodium salt of β-naphthalene sulfonic acid formamide condensate | 1.5 parts |
| Ion exchanged water | 81.5 parts |
| Ethylene glycol | 5 parts |

The foregoing components were mixed, and heated to 70° C. in a water bath so that the resin was dissolved completely. Then, 11 parts of carbon black (S170 manufactured by Degusa) and 1 part of isopropyl alcohol were added to the foregoing solution, premixed for 60 minutes, and dispersed by using zirconium beads, the diameter of which was 0.5 mm, for 10 hours, and then a centrifugal separation process (12000 rpm for 20 minutes) was performed to remove coarse and large particles so that dispersant 3 was obtained.

Composition of Black Ink B3

| | |
|---|---|
| Dispersant 3 | 10 parts |
| Glycerine | 10 parts |
| Diethylene glycol | 12 parts |
| 2-pyrrolidone | 10 parts |
| Isopropyl alcohol | 3 parts |
| Ion exchanged water | 55 parts |

The foregoing components were mixed, and monoethanol amine was added to make the pH to be 8 to 10, so that black ink B3 was obtained.

(4) Preparation of Dye Ink
(1) Preparation of ink Containing Salt
Composition of Yellow Ink Y1

| | |
|---|---|
| C.I. Direct Yellow-86 | 2 parts |
| Lauryl alcohol ethylene oxide additive (10 moles added) | 0.5 part |
| Ethylene glycol | 25 parts |
| Water | 68.5 parts |
| NaNO$_3$ | 4 parts |

Composition of Magenta Ink M1

| | |
|---|---|
| C.I. Direct Red 227 | 3 parts |
| Polyoxyethylene (10) - Polyoxypropylene (7) butyl ether | 3 parts |
| Diethylene glycol | 20 parts |
| Glycerine | 10 parts |
| AgNO$_3$ | 5 parts |
| Water | 59 parts |

Composition of Cyan Ink C1

| | |
|---|---|
| C.I. Acid Blue 9 | 3 parts |
| Lauryl ester sulfate sodium salt | 0.2 part |
| Ethylene glycol | 10 parts |
| Thiodiglycol | 15 parts |
| NaNO$_3$ | 4 parts |
| Water | 67.8 parts |

The foregoing components for yellow, magenta and cyan were mixed, filtered by membrane filter (trade name: Fluoropore Filter manufactured by Sumitomo) having a pore size of 0.22 μm under pressure, so that yellow ink Y1, magenta ink M1 and cyan ink C1 were obtained.

(2) Preparation of ink, the pH of which is 4 or lower
Preparation of Yellow ink Y2

| C.I. Basic Yellow 51 | 2 parts |
|---|---|
| Acetylene glycol ethylene oxide additive (10 moles were added) | 1 part |
| Diethylene glycol | 25 parts |
| Water | 72 parts |

Preparation of Magenta Ink M2

| C.I. Basic Red 27 | 3 parts |
|---|---|
| Polyoxyethylene (10) - Polyoxypropylene (7) butyl ether | 3 parts |
| Thiodiglycol | 20 parts |
| Glycerine | 10 parts |
| Water | 64 parts |
| Preparation of Cyan Ink C2 | 3 parts |
| C.I. Basic Blue 75 | |
| Sodium lauryl sulfate | 0.2 parts |
| Ethylene glycol | 15 parts |
| Thiodiglycol | 15 parts |
| Water | 66.8 parts |

The foregoing components for yellow, magenta and cyan were mixed and dissolved, and acetic acid was added so that pH of yellow, that of magenta and that of cyan were made to be 3, 3.5 and 2.5, respectively. The foregoing solution was filtered by a membrane filter (trade name: Fluoro-pore Filter manufactured by Sumitomo) the pore size of which was 0.22 μm so that yellow ink Y2, magenta ink M2 and cyan ink C2 were obtained.

(5) Recording

The ink prepared as described above was used to record alphabets and figures on two types of copying paper sheets (Xerox 4024 and NP-DRY manufactured by Canon) by the ink jet recording method. Recording heads of a type mounted on an ink jet printer BJC820 manufactured by Canon were used. As shown in FIG. 7, two recording heads were disposed in parallel on a carriage of the recording apparatus shown in FIG. 4. The recording conditions, such as the supply order (same as the reception order) and the volume of the ink droplet, were changed as shown in FIG. 7. The pigment ink and any one of the black, yellow, magenta or cyan dye inks was supplied to the same position. However, the electricity supply conditions to the heater, which supplies heat energy to the ink, was made constant so that voltage of 28 V was supplied, the pulse width was made to be 3.2 μ sec and drive frequency was made to be 5 kHz.

Recording images obtained in the examples were evaluated as follows:

(1) Density of Image

The density of the recorded image composed of alphabets, figures and solid print portion was measured by a Macbeth RD915 (trade name manufactured by Macbeth) to evaluate the results as follows:

A was given if the density was 1.25 or higher

B was given if the density was lower than 1.25 and 1.15 or higher

C was given if the density was lower than 1.15

(2) Time Taken to Fix Image

A 0.5 cm×1 cm solid print image block was recorded, a paper sheet was superposed on the surface of the recorded side after predetermined time intervals have passed, and a weight of 75 g/cm$^2$ was used to rub them to observe the contamination of the paper sheet superposed. The results were evaluated as follows:

A: contamination was prevented after 10 seconds or shorter had passed (10 seconds included)

B: contamination was prevented after 10 to 20 seconds had passed (20 seconds included)

C: contamination was prevented after 20 to 40 seconds had passed (40 seconds included)

D: contamination was prevented after 40 seconds or longer had passed

Table 5 shows the results of the evaluations.

TABLE 5

| Run No. | Pigment Black Ink | Dye ink | Supply order | Volume of droplet of pigment black ink | Volume of droplet of dye ink | CANON NO-DRY | | XEROX 4024 | |
|---|---|---|---|---|---|---|---|---|---|
| | | | | | | Image density | Time taken to fix ink | Image density | Time taken to fix ink |
| Example 24 | B1 | Y1 | Bk first | 71pl | 40pl | A | A | A | A |
| Example 25 | B2 | Y2 | Bk first | 68pl | 45pl | A | A | A | A |
| Example 26 | B3 | M1 | Bk first | 85pl | 38pl | A | A | A | A |
| Example 27 | B1 | M2 | Bk first | 70pl | 42pl | A | A | A | A |
| Example 28 | B2 | C1 | Bk first | 78pl | 42pl | A | A | A | A |
| Example 29 | B3 | C2 | Bk first | 89pl | 38pl | A | A | A | A |
| Example 30 | B1 | Y1 | Bk first | 72pl | 60pl | A | B | A | B |
| Example 31 | B2 | M2 | Bk first | 65pl | 80pl | A | B | A | B |
| Example 32 | B3 | C1 | Bk first | 82pl | 71pl | A | B | A | B |
| Example 33 | B1 | Y2 | Bk second | 69pl | 40pl | A | B | A | B |
| Example 34 | B2 | M2 | Bk second | 71pl | 45pl | A | B | A | B |
| Example 35 | B3 | C2 | Bk second | 82pl | 38pl | A | B | A | B |

According to the fourth aspect of the present invention, an optical density of a recorded image is remarkably improved and an image with good quality and fastness is obtained.

Although the present invention has been described with respect to what is considered to be the preferred embodiments, it is understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet recording process comprising the steps of: providing a recording material,
providing at least color inks of yellow, magenta and cyan and a black ink, and ejecting the inks onto the recording material to record a color image and a black image on the recording material, wherein the inks of the yellow, magenta and cyan colors contain at least a surfactant and/or a solvent which provide penetrability of the color inks into the recording material and a salt, and the black ink comprises a pigment, a water-soluble solvent, water and a dispersant for dispersing the pigment, which black ink causes viscosity increase or aggregation by dispersion breaking with the salt, and wherein the black ink and the color inks overlap each other on the recording material.

2. The ink-jet recording process according to claim 1, wherein the surfactant added to the recording inks of the yellow, magenta and cyan colors is one of ionic surfactants, nonionic surfactants and amphoteric surfactants, or a mixture of at least two surfactants thereof.

3. The ink-jet recording process according to claim 1, wherein the surfactant added to the recording inks of the yellow, magenta and cyan colors is a nonionic surfactant.

4. The ink-jet recording process according to claim 1, wherein the surfactant added to the recording inks of the yellow, magenta and cyan colors comprises at least one compound selected from ethylene oxide adducts of higher alcohols, ethylene oxide adducts of alkylphenols, ethylene oxide-propylene oxide copolymers and ethylene oxide adducts of acetylene glycol.

5. The ink-jet recording process according to claim 1, wherein the solvent added to the recording inks of the yellow, magenta and cyan colors comprises at least one compound selected from ethers, lower alkyl ethers of polyhydric alcohols and monohydric alcohols.

6. The ink-jet recording process according to claim 1, wherein the dispersant is an alkali-soluble resin.

7. An ink jet recording method comprising the steps of:

providing a recording medium, and discharging a black ink and a color ink onto the recording medium, overlapping the black ink with the color ink on the recording medium, wherein said color ink contains a water-soluble dye, a water-soluble solvent, water and a salt, and said black ink comprises a pigment, a water-soluble resin for dispersing said pigment and water, which black ink causes viscosity increase or aggregation by dispersion breaking with the salt.

8. An ink jet recording method according to claim 7, wherein said color ink is any one of cyan, yellow or magenta ink.

9. An ink jet recording method according to claim 7, wherein said salt contains one or more materials selected from a group consisting of sodium chloride, potassium chloride, lithium chloride, ammonium chloride, calcium chloride, magnesium chloride, barium chloride, calcium carbonate, magnesium carbonate, barium carbonate, sodium carbonate, lithium carbonate, ammonium carbonate, sodium acetate, potassium acetate, lithium acetate, sodium sulfate, potassium sulfate and aluminum sulfate.

10. An ink jet recording method according to claim 7, wherein the pH of said black ink is 7 to 10.

11. An ink jet recording method according to claim 7, wherein ink is discharged by applying a heat energy to ink.

* * * * *

UNITED STATES PATENT AND TRADEMARK OFFICE
CERTIFICATE OF CORRECTION

PATENT NO. : 5,734,403
DATED : March 31, 1998
INVENTOR(S) : YUKO SUGA, ET AL.

It is certified that error appears in the above-indentified patent and that said Letters Patent is hereby corrected as shown below:

COLUMN 1:

Line 6, "Sep. 1" should read --Sep. 13--.

COLUMN 3:

Line 21, "inks" (second occurrence) should read --ink--.

COLUMN 9:

Line 28, "Degussa)" should read --Degusa)--.

COLUMN 10:

Line 59, "laiylsulfonates;" should read --larylsulfonates;--.

COLUMN 12:

Line 43, "inks" should read --ink--.

COLUMN 16:

Line 20, insert "(Y-3)" right of chemical formula.

COLUMN 18:

Line 19, "alkylallylsul-" should read --alkylarylsul--.

UNITED STATES PATENT AND TRADEMARK OFFICE
CERTIFICATE OF CORRECTION

PATENT NO. : 5,734,403
DATED : March 31, 1998
INVENTOR(S) : YUKO SUGA, ET AL.

It is certified that error appears in the above-indentified patent and that said Letters Patent is hereby corrected as shown below:

COLUMN 19:

Line 24, "size" should read --the size--.

COLUMN 23:

Line 23, "Composition" should read --(begin new line) Composition--; and
    Line 24, "Yellow:" should read --(begin new line) Yellow:--.

COLUMN 24:

Line 67, "Composition" should read --(begin new line) Composition--.

COLUMN 28:

Line 44, "0 parts" should read --5 parts--.

COLUMN 29:

Line 2, insert: "(Preparation of pigment dispersion)"; and
    Line 42, "Degussa)" should read --Degusa)--.

COLUMN 35:

Line 7, "EXAMPLE" should read --EXAMPLES--.

UNITED STATES PATENT AND TRADEMARK OFFICE
CERTIFICATE OF CORRECTION

PATENT NO. : 5,734,403
DATED : March 31, 1998
INVENTOR(S) : YUKO SUGA, ET AL.

It is certified that error appears in the above-indentified patent and that said Letters Patent is hereby corrected as shown below:

COLUMN 37:

Line 15, "Preparation of Cyan Ink C2" should conform to format: type size and rules top and bottom; "3 parts" should be deleted; and
Line 16, "C.I. Basic Blue 75" should read
--C.I. Basic Blue 75        3 parts--.

COLUMN 38:

Table 5, "NO-DRY" should read --NP-DRY--.

Signed and Sealed this

Twenty-eighth Day of September, 1999

Attest:

Q. TODD DICKINSON

*Attesting Officer*     Acting Commissioner of Patents and Trademarks